United States Patent
Obrock et al.

(10) Patent No.: US 6,786,562 B2
(45) Date of Patent: Sep. 7, 2004

(54) REFRIGERATION SHELF AND METHOD OF MAKING THE SAME

(75) Inventors: Thomas W. Obrock, Hendersonville, TN (US); Peter F. Gerhardinger, Maumee, OH (US)

(73) Assignee: Engineered Glass Products LLC, Chicago, IL (US)

(*) Notice: Subject to any disclaimer, the term of this patent is extended or adjusted under 35 U.S.C. 154(b) by 0 days.

(21) Appl. No.: 09/934,943

(22) Filed: Aug. 22, 2001

(65) Prior Publication Data

US 2003/0038571 A1 Feb. 27, 2003

(51) Int. Cl.$^7$ ............................................. A47B 96/02
(52) U.S. Cl. ........................................ 312/408; 211/153
(58) Field of Search ............................ 312/408, 126, 312/127, 410; 211/135, 153; 428/122, 210; 108/27

(56) References Cited

U.S. PATENT DOCUMENTS

| | | | | |
|---|---|---|---|---|
| 2,032,235 A | * | 2/1936 | Thomas | 211/153 |
| D114,685 S | * | 5/1939 | Mikesell | D7/550.1 |
| D161,752 S | * | 1/1951 | Hart | D7/554.3 |
| 2,662,382 A | * | 12/1953 | Potchen | 294/172 |
| 3,633,983 A | | 1/1972 | Whitcomb | |
| 3,765,344 A | * | 10/1973 | Ferdinand et al. | 108/108 |
| 3,851,808 A | * | 12/1974 | Schilling | 294/172 |
| 4,166,873 A | * | 9/1979 | Gilliam et al. | 428/34.7 |
| 4,934,541 A | | 6/1990 | Bussan | |
| 5,034,861 A | | 7/1991 | Sklenak et al. | |
| 5,273,354 A | | 12/1993 | Herrmann et al. | |
| 5,287,252 A | | 2/1994 | Caruso | |
| 5,362,145 A | | 11/1994 | Bird et al. | |
| 5,429,433 A | | 7/1995 | Bird et al. | |
| 5,441,338 A | * | 8/1995 | Kane et al. | 312/408 |
| 5,516,204 A | | 5/1996 | Calvert | |
| 5,524,981 A | | 6/1996 | Herrmann et al. | |
| 5,540,493 A | | 7/1996 | Kane et al. | |
| 5,564,809 A | | 10/1996 | Kane et al. | |
| 5,677,030 A | | 10/1997 | Shanok et al. | |
| 5,705,113 A | | 1/1998 | Kane et al. | |
| 6,105,233 A | * | 8/2000 | Neal | 29/451 |
| 6,113,206 A | | 9/2000 | Melson | |
| 6,422,673 B1 | | 7/2002 | Bienick | |

FOREIGN PATENT DOCUMENTS

| | | |
|---|---|---|
| DE | 4128504 | 4/1993 |
| EP | 0424694 | 5/1991 |
| EP | 1099917 A1 | 5/2001 |
| WO | wo 009731558 a * | 4/1997 |

* cited by examiner

Primary Examiner—Lanna Mai
Assistant Examiner—Hanh V. Tran
(74) Attorney, Agent, or Firm—Marshall & Melhorn, LLC

(57) ABSTRACT

A refrigerator shelf has an upper surface and a perimeter edge defined by a front edge, two side edges, and a rear edge. A reservoir for liquids spilled on the shelf is partially created by upwardly turning the front and rear edges of the shelf member. At least two end caps, which extend above the upper surface, are applied to the two side edges to complete the walls of the reservoir. The shelf may be supported within the refrigerator compartment in a horizontal orientation either by cantilever beams, or by slidably engaging the shelf with channels located within the sidewalls of the refrigerator compartment.

36 Claims, 20 Drawing Sheets

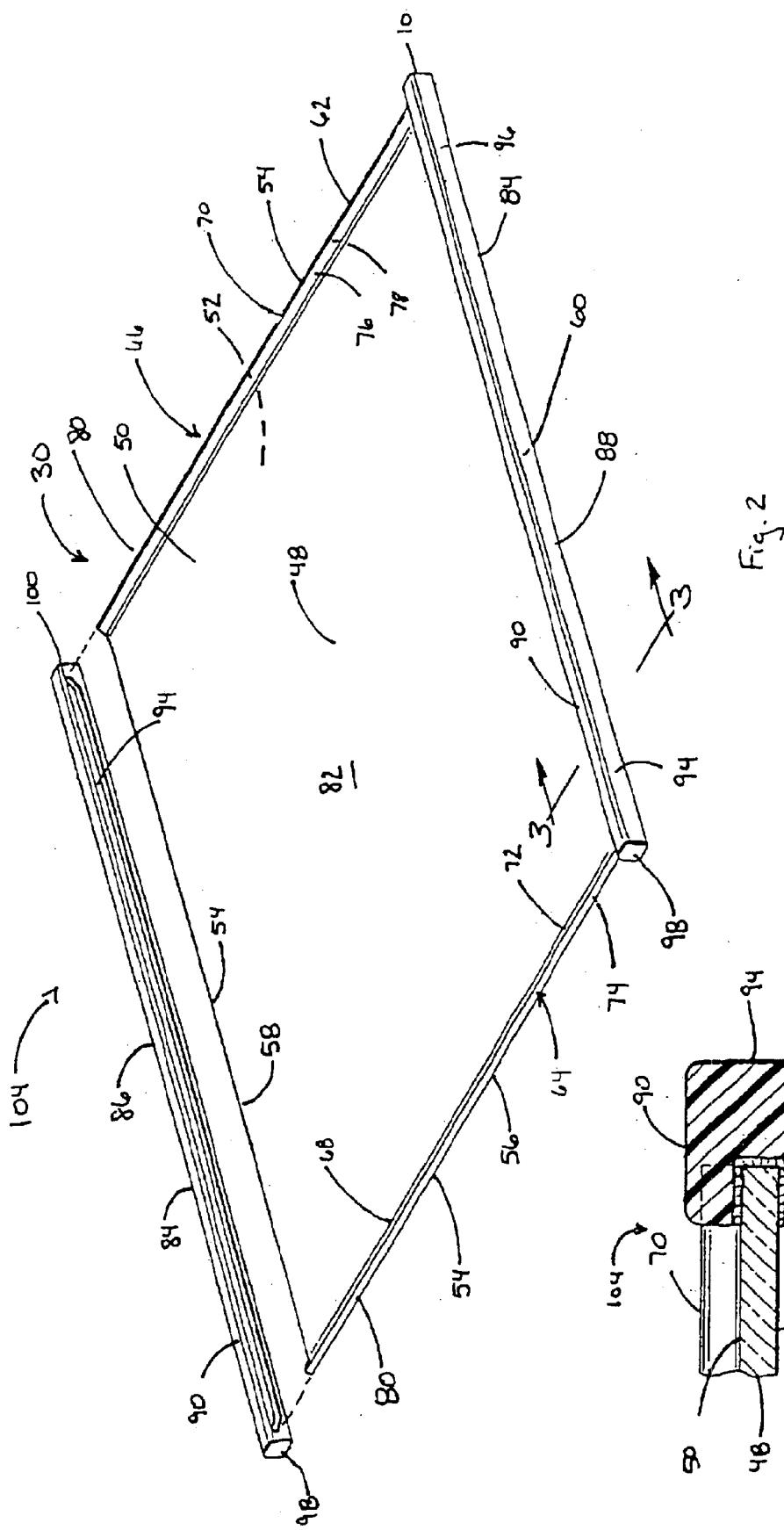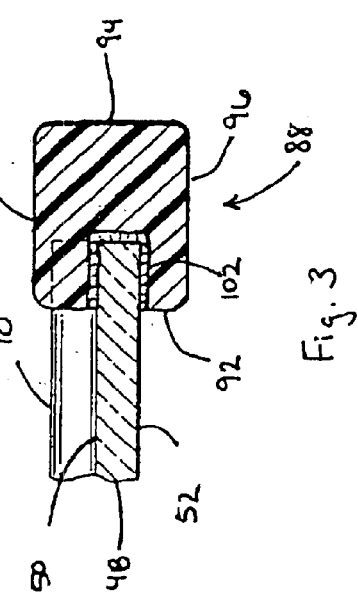

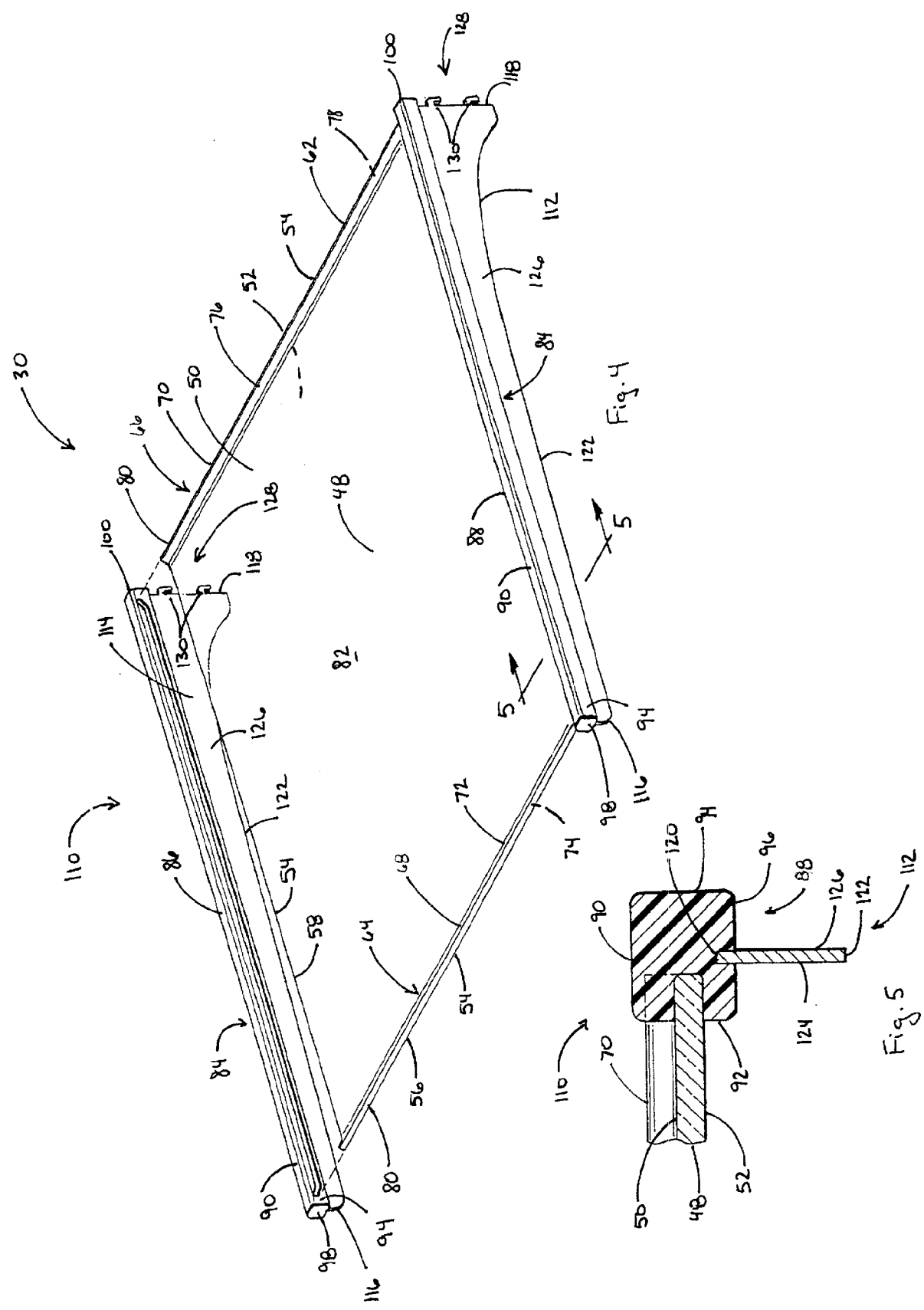

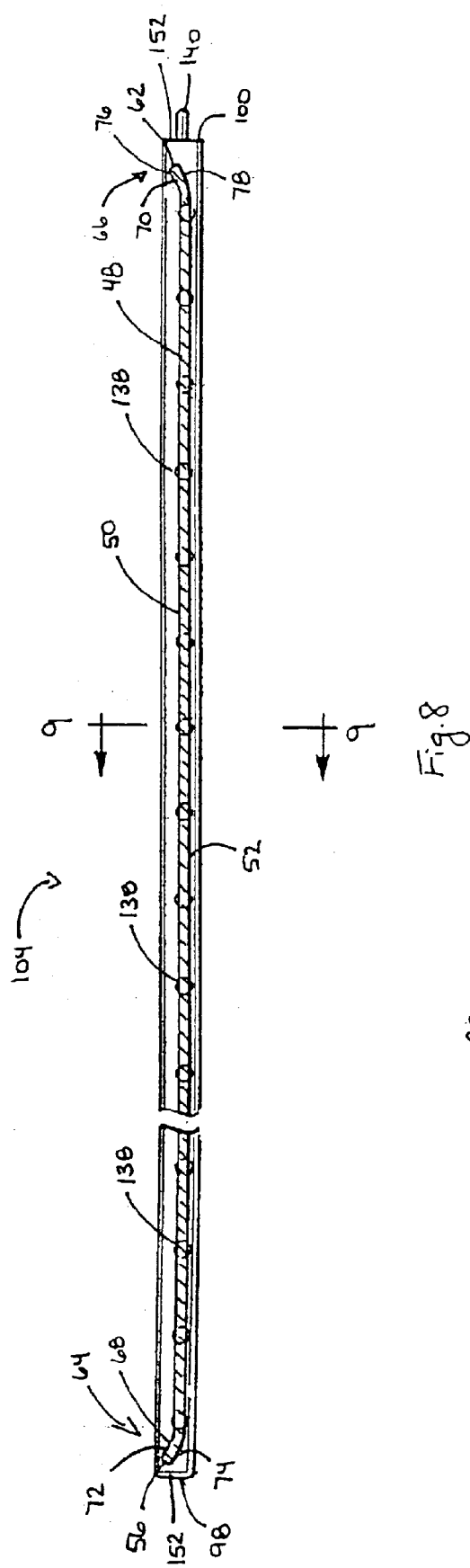
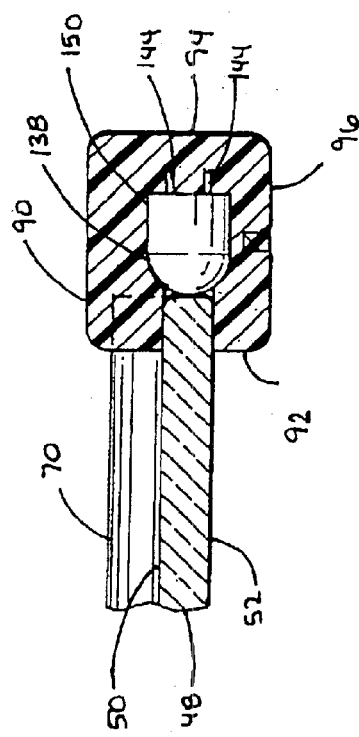

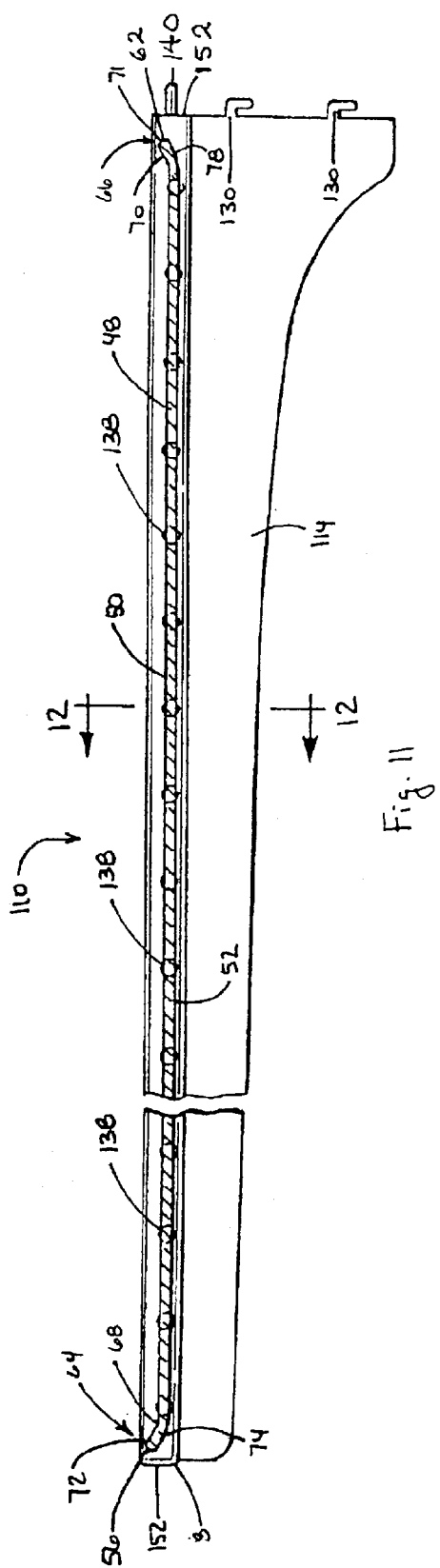
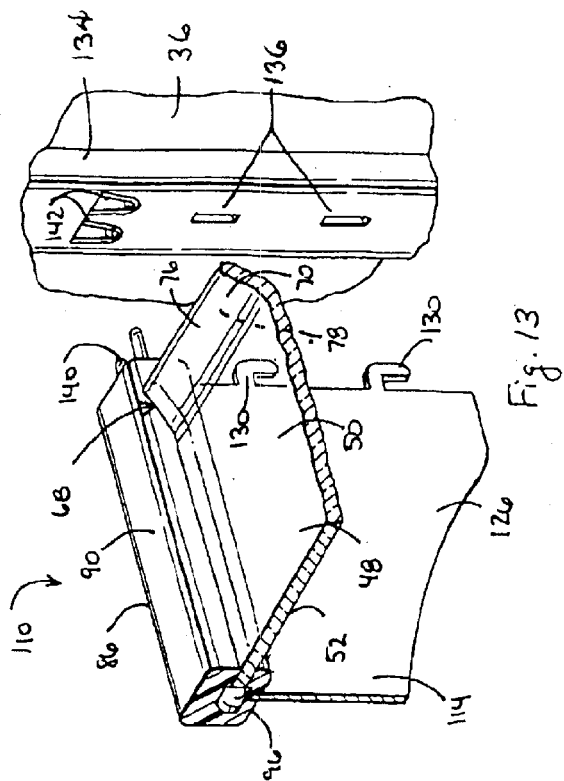
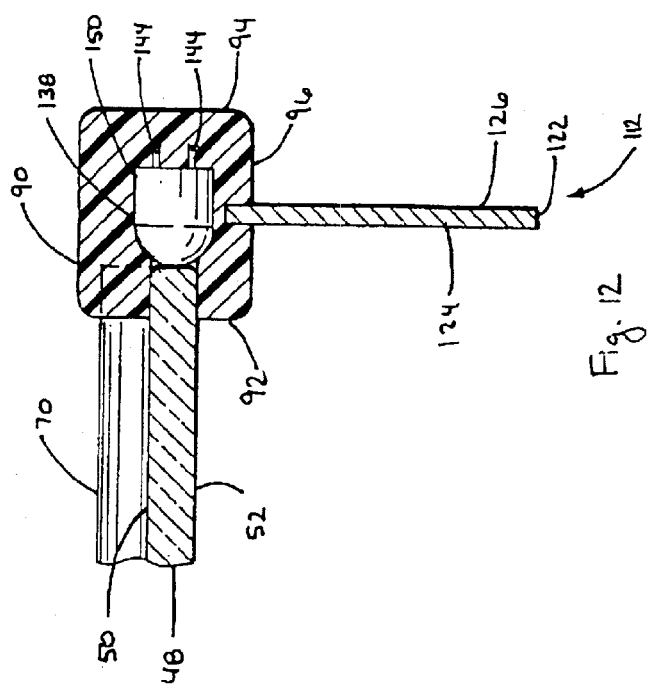

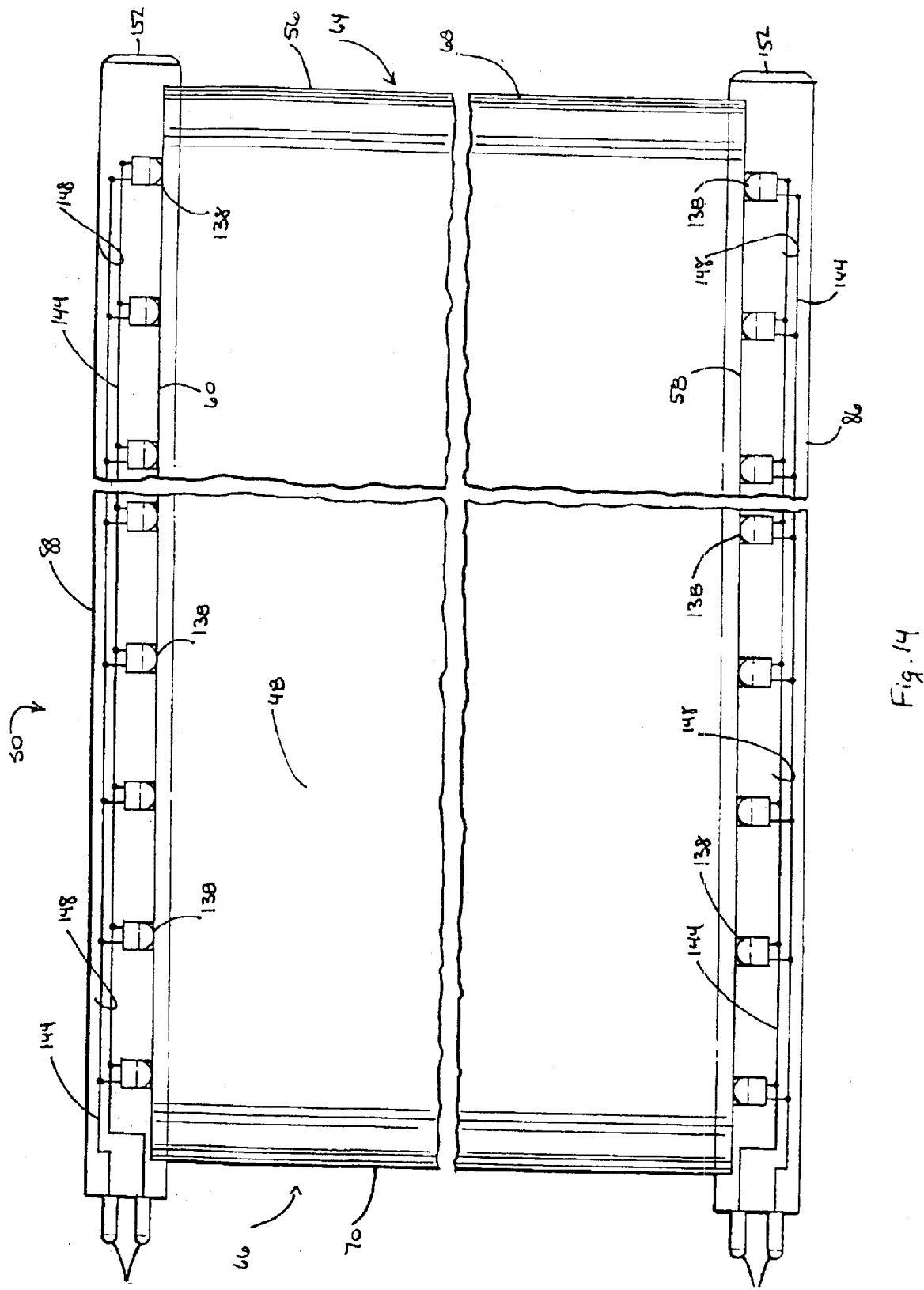

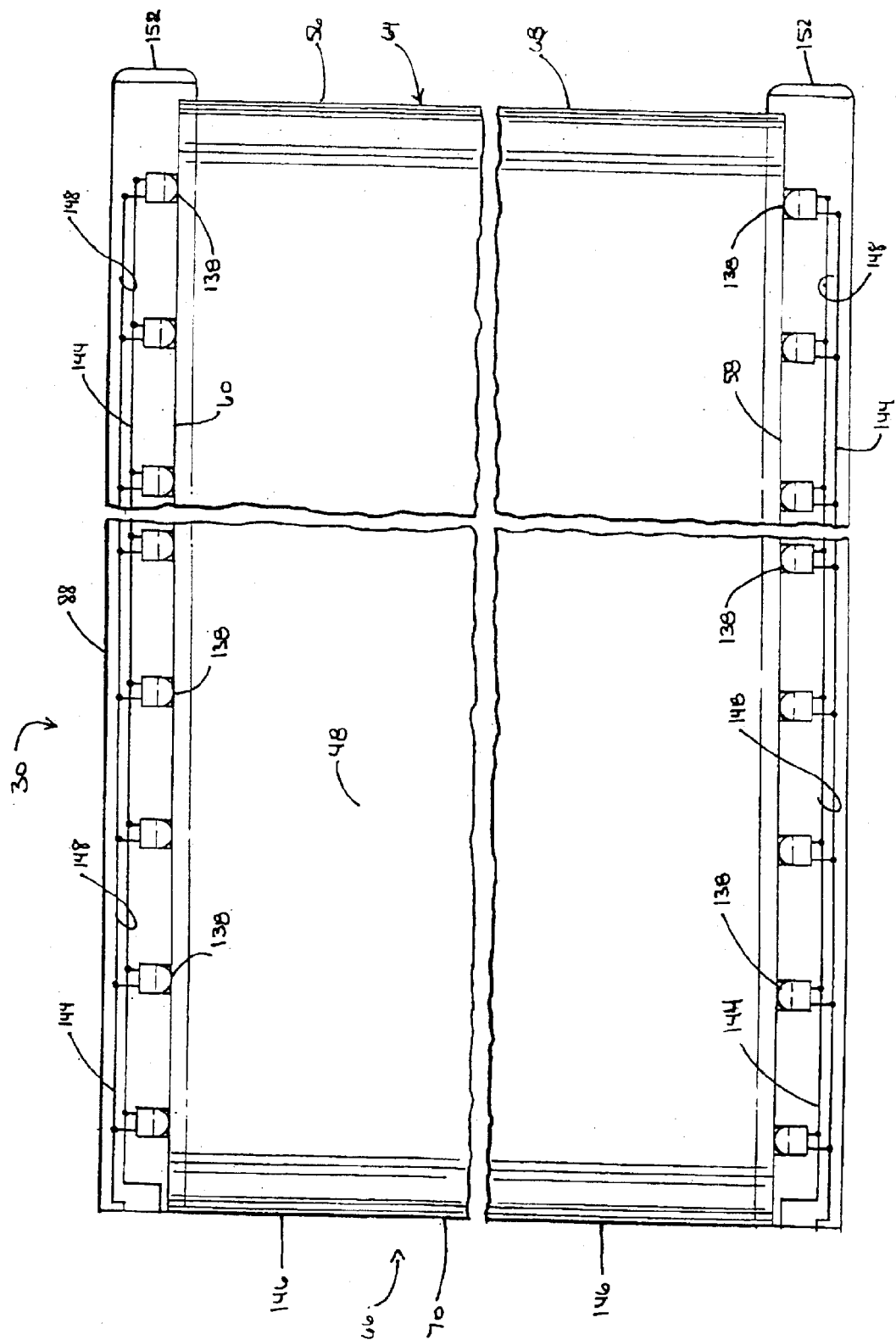

REFRIGERATION SHELF AND METHOD OF MAKING THE SAME

BACKGROUND OF THE INVENTION

1. Field of the Invention

This invention relates to spill-proof shelving for appliances such as refrigerators, freezers and the like. More specifically, the present invention is a tempered, half-width shelf typically used in a side-by-side refrigerator/freezer unit, or in an over-under unit where the shelves are split. The shelf uses at least one upturned edge, created by a roll forming process, and end caps, located on the other edges of the shelf, to create a reservoir for spilled liquids on an upper surface of the shelf.

As is the nature of articles containing liquid which are stored in the refrigerator, many such articles are spillable and do spill, or leak. Such a spill or leak will typically soak into other items or contaminate other foods in the refrigerated compartment. Extensive cleanup efforts are required since the spill will commonly flow down, through the compartment, from shelf to shelf. Therefore, it is desirable to provide containment measures for limiting the area of such a spill. Such measures will contain a spill to the shelf and minimize, if not preclude, the downward flow of the spill through the compartment.

2. Discussion of Related Art

In the prior art, a liquid reservoir was created on a shelf by encapsulating the entire perimeter of the shelf with one continuous molding, or individual molding pieces fitted to each edge. The moldings were typically made of polypropylene and projected above the surface of the shelf to retain spilled liquids thereon. This technique of manufacturing spill-proof shelves was time consuming and expensive as a result of the need for polypropylene moldings on each edge.

The prior art also teaches that refrigerators and the like are commonly constructed with one or more lights mounted to the back or top surface of the compartment to provide illumination. Refrigerators are also frequently constructed with movable shelves adapted to change the distance between adjacent shelves to accommodate different food heights. However, when a shelf is moved, it may block the light source causing shade spots in the compartment. Further, when food is placed on the shelves, the food may interfere with the light passing though the shelf, also resulting in shade spots.

Alternatively, it is known to provide one or more lights on the shelf itself to provide illumination to the shelf and to the compartment. The lights are connected to a source of electricity typically located on the rear wall of the compartment. This arrangement has the disadvantage of requiring the user to reposition the wiring once a shelf was moved. Repositioning of the wiring could result in an electrical shock from an uninsulated electrical conductor or wire.

The present invention provides an effective, low cost, spill-proof shelf for refrigerators and the like. The invention reduces the need for polypropylene by using a roll form process to upturn at least one of the shelf edges to partially form a liquid reservoir for spilled liquids. Polypropylene end caps are located on the remaining edges to enclose the shelf and complete the reservoir.

In an alternative embodiment, the shelf is provided with lighting to illuminate the shelf, the contents located thereon and the compartment. The lighting is connected to a stepped-down voltage source, such as a transformer, to reduce the voltage below the UL threshold for appliances and reduce, or eliminate, the risk of electrical shock. The risk of electrical shock is also reduced, or eliminated, by locating the lighting and its wiring within the end caps.

BRIEF DESCRIPTION OF THE DRAWINGS

The above, as well as other advantages of the present invention, will become readily apparent to those skilled in the art from the following detailed description when considered in the light of the accompanying drawings in which:

FIG. 2 is an isometric view of a channel-supported shelf;

FIG. 3 is a sectional view along line 3—3 of FIG. 2;

FIG. 4 is an isometric view of a cantilever-supported shelf;

FIG. 5 is a sectional view along line 5—5 of FIG. 4;

FIG. 8 is a sectional view along line 8—8 of FIG. 7;

FIG. 9 is a sectional view along line 9—9 of FIG. 7;

FIG. 11 is a sectional view along line 11—11 of FIG. 10;

FIG. 12 is a sectional view along line 12—12 of FIG. 10;

FIG. 13 is a sectional view of a cantilever supported shelf, male and female electrical connections and a slot pair on a track of the compartment rear wall;

FIG. 14 is an electrical schematic top view of a shelf with lighting;

FIG. 15 is an alternative electrical schematic top view of a shelf with lighting;

DETAILED DESCRIPTION OF THE PREFERRED EMBODIMENT

Figure 1:
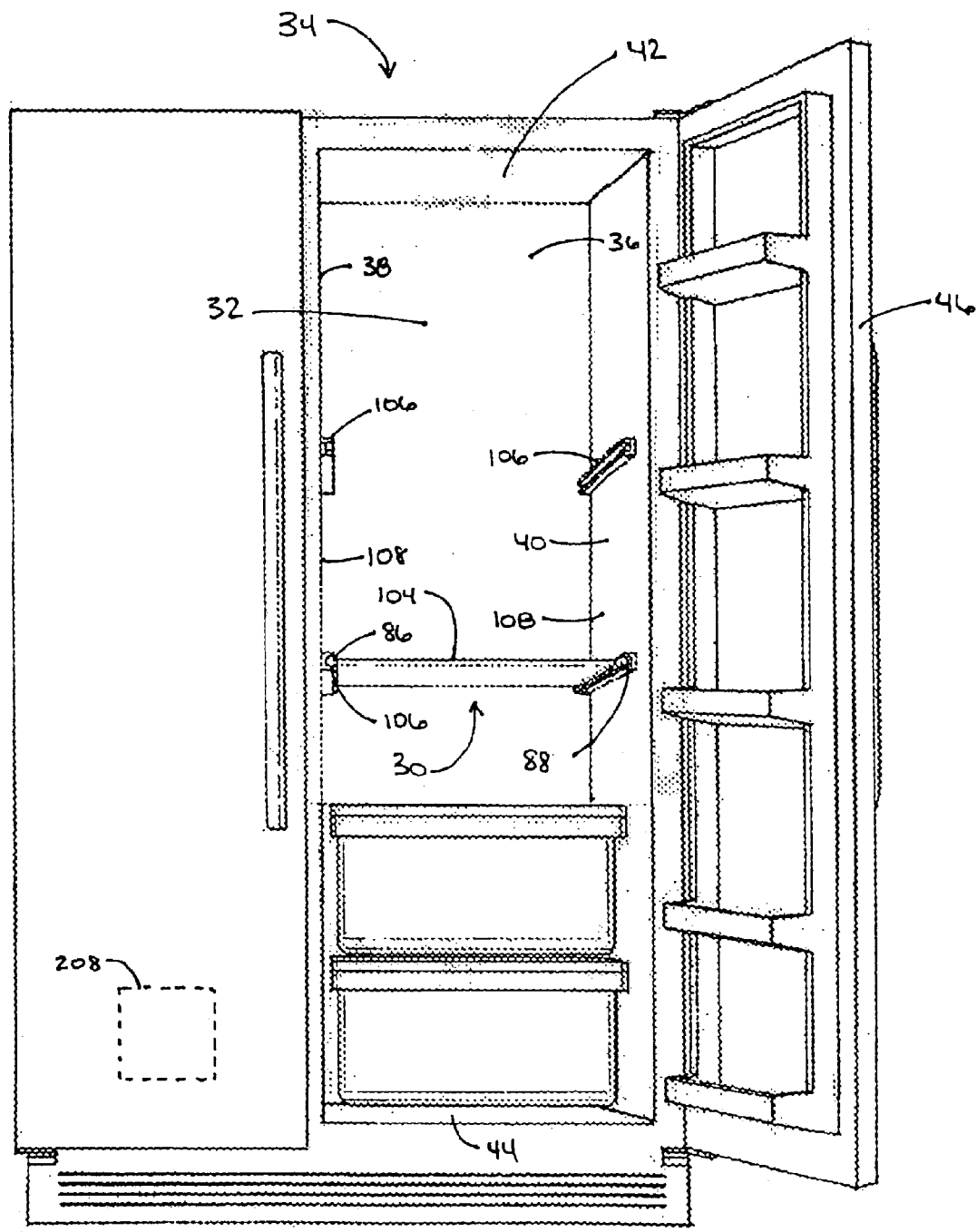
FIG. 1 is a front view of a refrigerator and its interior compartment having a channel supported shelf located therein.
Figure 34:
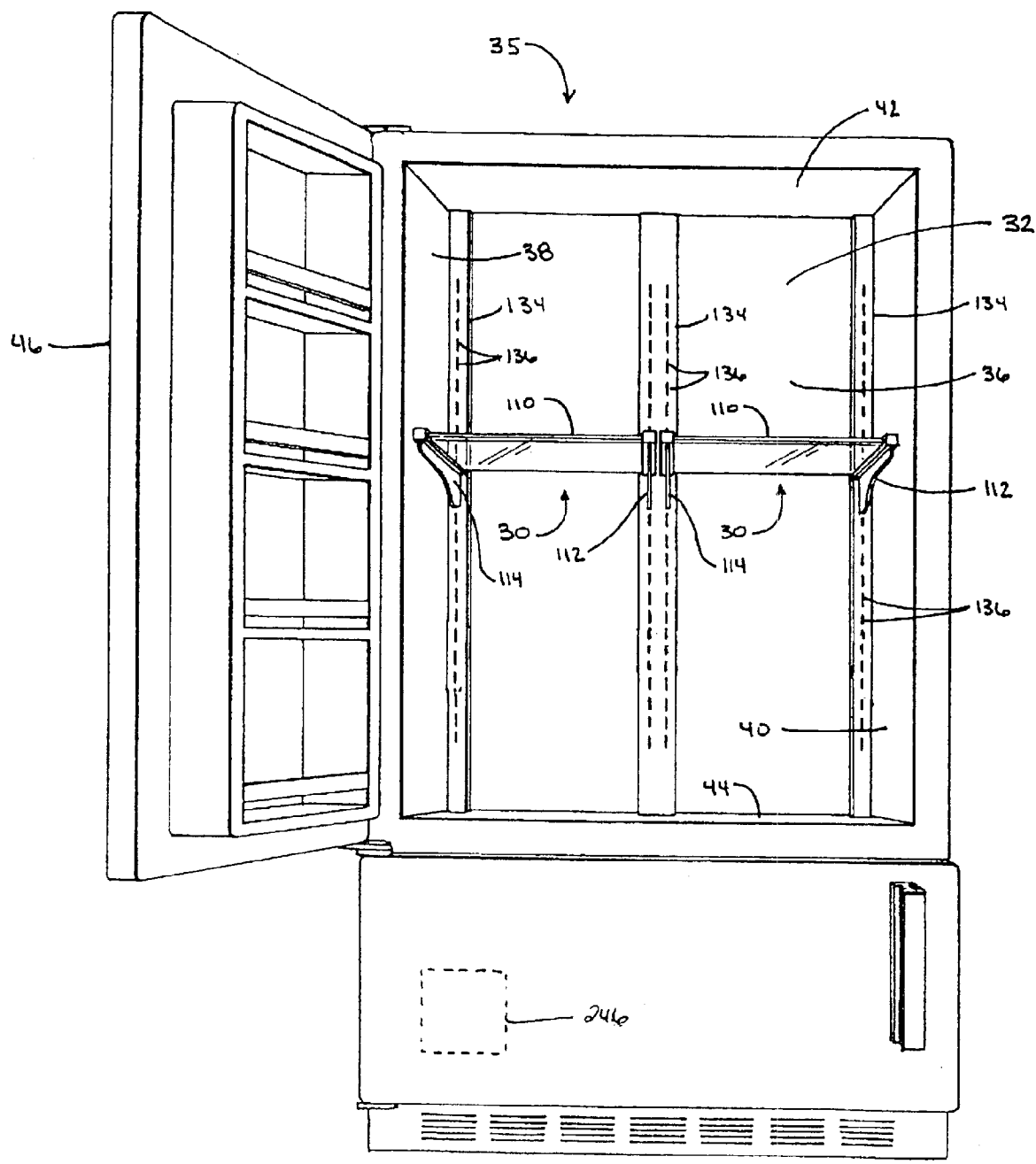
FIG. 34 is a front view of a refrigerator and its interior compartment having a cantilever supported shelf located therein.

FIG. 1 depicts a preferred embodiment of the invention which includes at least one shelf 30 located within an interior compartment 32 of an appliance, such as a refrigerator 34. In a more preferred embodiment, the shelf 30 is a half-width shelf 30 located within the interior compartment 32 of a side-by-side refrigerator/freezer unit 34. In an alternative embodiment, the shelf 30 is a half-width shelf 30 located within the interior compartment 32 of an over-under refrigerator/freezer unit 35 as depicted in FIG. 34. The interior compartment 32 has a rear wall 36, a left wall 38, a right wall 40, a top 42, a bottom 44, and a door 46.

Referring to FIG. 2, the shelf 30 is preferably a flat plate 48 having a substantially planar upper surface 50 and constructed of a light transmitting material, preferably optically clear, tempered glass, to enhance light distribution through the refrigerator compartment 32. The glass is preferably a soda-lime-silicate glass with typical weight percentages of:

| | |
|---|---|
| $SiO_2$ | 65–80% |
| $Na_2O$ | 10–20% |
| CaO | 5–15% |
| BaO | 0.5–5.0% |
| MgO | 0–10% |
| $Al_2O_3$ | 0–5% |
| $B_2O_3$ | 0–5% |
| $K_2O$ | 0–5% |
| Ba + Ca + Mg | >10% |

Other minor ingredients, including melting and refining aids, such as $SO_3$, may also appear in the glass composition.

The plate 48 has a lower surface 52 and a perimeter 54 including a front edge 56, a left edge 58, a right edge 60, and a rear edge 62. The upper surface 50 of the plate 48 may be contoured to facilitate a variety of specific purposes, but generally it provides a planar surface 50 to support items placed thereon for storage in the refrigerator 34.

In a preferred embodiment, at least one portion integrally formed from the plate 48 adjacent an edge is upwardly turned, thereby creating a barrier for spilled liquids. In a more preferred embodiment, two portions of the plate 48 adjacent two different edges are upwardly turned to create two barriers for spilled liquids. In a most preferred embodiment, a first portion 64 of the plate 48 adjacent the front edge 56 is upwardly turned, thereby creating a front flange 68, and a second portion 66 of the plate 48 adjacent the rear edge 62 is upwardly turned, thereby creating a rear flange 70. The front flange 68 has an upper 72 and lower surface 74. Similarly, the rear flange 70 has an upper 76 and a lower 78 surface.

Figure 21:
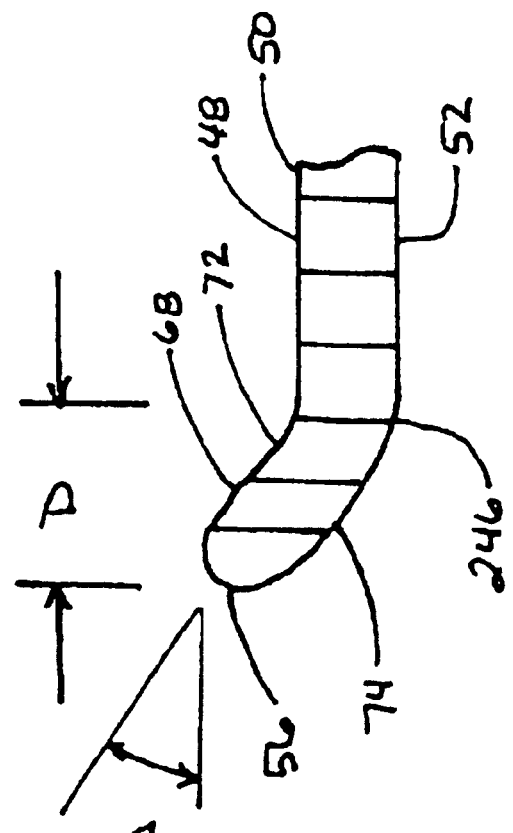
FIG. 21 is a side view of an alternative embodiment of a plate.
Figure 20:
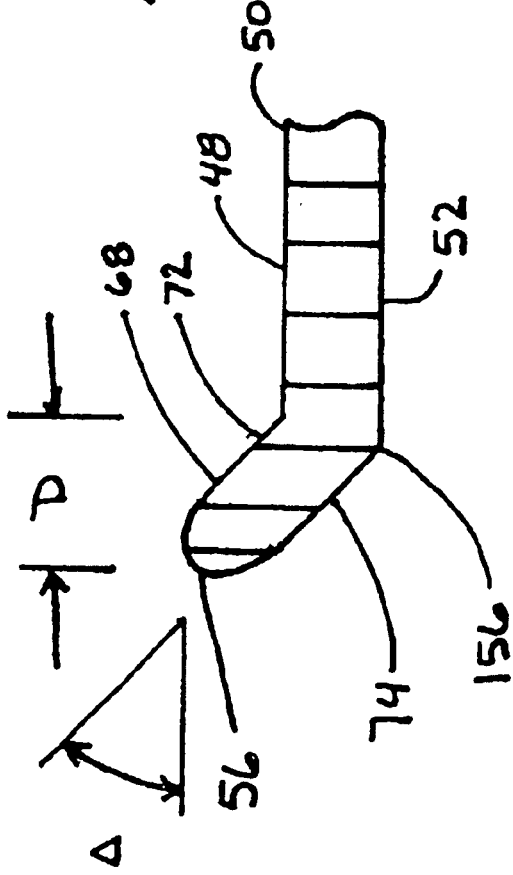
FIG. 20 is a side view of a plate.

Preferably, the flanges 68, 70 are approximately 0.157 to 0.315 inches wide, but in a more preferred embodiment the flanges 68, 70 are a distance D approximately 0.236 inches wide, as depicted in FIGS. 20 and 21. The flanges 68, 70 are upwardly turned approximately 30–90 degrees from the horizontal. In a more preferred embodiment, the flanges 68, 70 are upwardly turned at an angle A of approximately 45 degrees, as depicted in FIGS. 20 and 21. Although specific dimensions for the width and upward angle of the flanges 68, 70 have been provided above, the flanges 68, 70 may be any width or angle capable of retaining spilled liquid on the shelf.

The upwardly turned front 68 and rear 70 flanges become a barrier 80 for a spilled liquid reservoir 82 on the upper surface 50 of the shelf 30. The reservoir 82 is completed by locating additional barriers 84 on the left 58 and right 60 edges of the plate 48. Preferably, the additional barriers 84 on the left 58 and right 60 edges include left 86 and right 88 end caps.

As depicted in FIGS. 2–5, the end caps 86, 88 are preferably formed in a rectangular shape having a top 90, a left 92, a right 94, a bottom 96, a front 98 and a rear 100 surface, however, other shapes are well within the scope and spirit of this invention. Regardless of their geometric design, the end caps 86, 88 are designed to extend at least above the top surface 90 of the plate 48 and, in a preferred embodiment, extend upwardly to meet with the upturned edges 56, 62 to form the reservoir 82.

As best shown in FIG. 3, a seal 102 is preferably located between the plate 48 and the end caps 86, 88 to ensure that a spilled liquid does not seep between the plate 48 and the end caps 86, 88. In one preferred embodiment, the seal 102 is a siloxane-type polymer. Silanes having reactive alkyl groups, such as, for example, vinyl, amino, epoxide, mercaptan, and hydroxyl chemically couple the end caps 86, 88 to the plate 48 thereby creating a fluid tight seal 102. Such siloxane-type polymers are well-known to those skilled in the art.

In an alternative embodiment, the seal 102 is an adhesive located between the end caps 86, 88 and the plate 48. In a preferred alternative embodiment, the adhesive is a Room-Temperature-Vulcanizing (RTV) silicon. The silicon adhesive forms a fluid-tight bond between the end caps 86, 88 and the plate 48 thereby preventing fluid from seeping between the plate 48 and the end caps 86, 88. Such adhesives are well-known to those skilled in the art.

In one embodiment of the shelf 30, hereinafter generally referred to as 104 and depicted in FIG. 1, the end caps 86, 88 slidably engage with one of a plurality of channels 106 integrally formed with the side walls 38, 40 of the compartment 32. The channels 106 are located along a plurality of spaced-apart vertical intervals 108 to accommodate a variety of shelf 30 positions. The shelves 30 may be readily removed from their channels 106 for the purposes of replacement, re-positioning, or cleaning.

Although the channels 106 are depicted for engagement with a substantially rectangular end cap 86, 88, it should be understood that a variety of end cap 86, 88 designs, and their corresponding channel designs 106, are within the scope and spirit of the present invention. Indeed, any end cap 86, 88 and channel 106 design capable of supporting the weight of the shelf 30 and the items placed thereon is within the scope of the invention.

Each channel 106 has a terminal point (not depicted) with which the back surface 100 of each end cap 86, 88 comes into abutting contact. The terminal point is preferably located such that it maintains the shelf 30 away from the rear wall 36 to facilitate the circulation of air between shelves 30 thereby maintaining a homogeneous temperature distribution within the compartment 32. However, the terminal point is also located deep enough in the compartment 32 to maintain the shelf 30 from the compartment door 46. Preferably, the shelves 30 are maintained approximately 1 inch from the rear wall 36 and the compartment door 46.

An alternative embodiment of the shelf 30, depicted in FIG. 4 and hereinafter generally referred to as 110, includes attaching each end cap 86, 88 to a corresponding right 112 and left 114 cantilever beam. FIGS. 4 and 5 depict preferred embodiments of the cantilevered shelf 110, although any projecting beam or member which is supported at one end and is capable of supporting the weight of the shelf 30 and the items placed thereon is within the scope of the present invention. The beams 112, 114 may be constructed of a variety of materials, including, but not limited to, stainless steel, fiberglass or plastic.

The cantilever beams 112, 114 each have a front edge 116, a rear edge 118, a top edge 120, a bottom edge 122, and a left 124 and a right 126 surface. In a preferred embodiment, the top edge 120 is securely located on the bottom surface 96 of an end cap 86, 88 by molding, gluing, friction fitting, encapsulating or any other suitable attachment means.

The rear edge 118 has located thereon a means 128 for releasable engagement with the rear wall 36 of the compartment 32. The means for engagement 128 includes, but is not limited to, hooks, screws, friction fittings and other mechanical fasteners. The means for engagement 128 readily allows the shelf 30 to be engaged and disengaged from the rear wall 36 for the purpose of replacement, repositioning or cleaning. In a preferred embodiment, the means for engagement 128 includes at least two hooks 130 integrally formed with the rear edge 118 of each beam 112,114.

Figure 6:
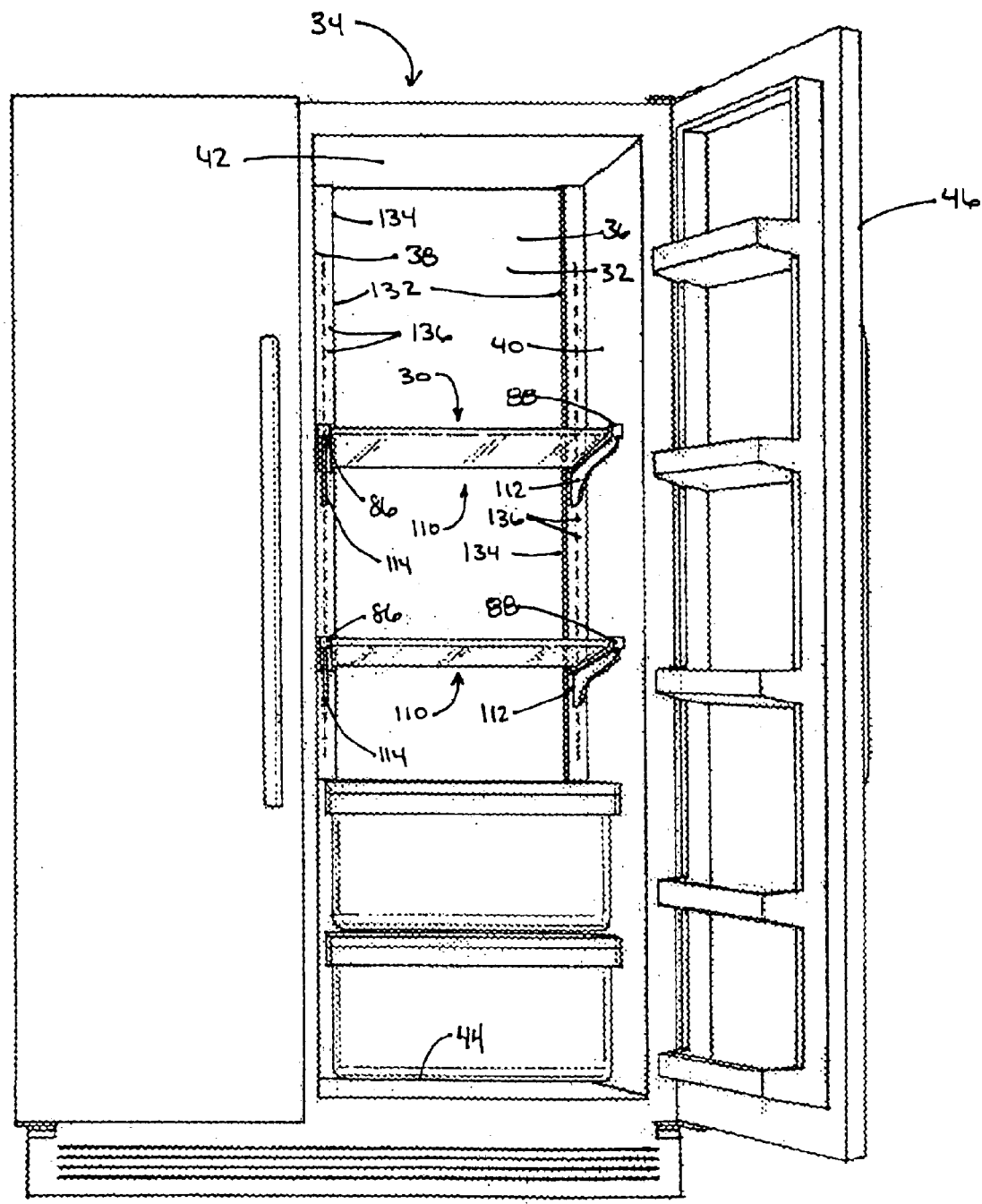
FIG. 6 is a front view of a refrigerator and its interior compartment having a cantilever supported shelf located therein.

FIG. 6 depicts a preferred embodiment of the invention wherein a pair of tracks 132 is attached to the rear wall 36 of the compartment 32. The tracks 132 preferably extend from the bottom 44 of the compartment 32 to the top 42 of the compartment 32. Each track 134 has located thereon a plurality of slot pairs 136 located substantially along its entire length. Preferably, the hooks 130 located on the cantilever beams 112, 114 engage with a slot pair 136 thereby becoming removably attached to each track 134. The hook 130 and track 134 combination is designed to maintain the rear edge 62 of the shelf 30 at least one inch from the rear wall 36 to facilitate air circulation between the shelves 30.

FIG. 34 depicts an alternative embodiment of the invention wherein individual tracks 134 are attached to the rear wall 36 of the compartment 32. The tracks are substantially similar in form and function to the pair of tracks 132 depicted in FIG. 6. The tracks 134 support one or more half-width shelves 30 in the over-under refrigerator/freezer embodiment 35.

Figure 7:
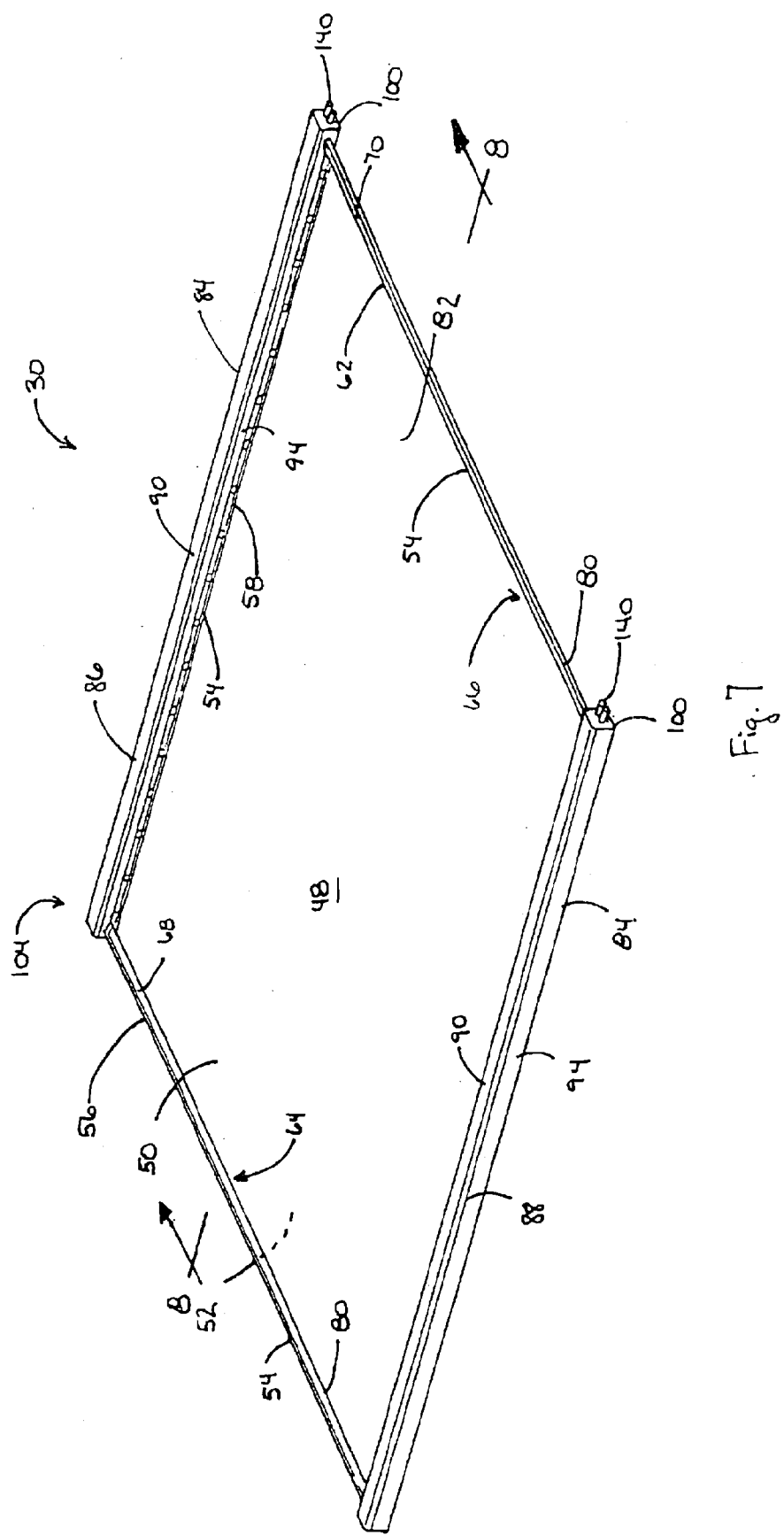
FIG. 7 is an isometric view of a channel supported shelf having lighting within end caps.

FIGS. 7 and 8 depict two additional embodiments of the shelf 30 wherein lights 138 are integrated into the channel supported end caps 104 and the cantilever supported end caps 104, 110, respectively, to provide illumination to the shelf 30 and the refrigerator compartment 32.

In preferred embodiments for both of the above-described end caps 104, 110, there are a plurality of lights 138 located within each end cap 104, 110 substantially along their entire length. In a more preferred embodiment, approximately 18 evenly spaced lights 138 are located within each end cap 104, 110. The lights 138 preferably are 300 milliamp, 3.6 watt lights 138, thereby providing approximately 65 watts of light per end cap 104, 110. However, the number and output of the lights 138 may vary without departing from the scope of the present invention.

A step-down transformer 208, preferably located in the mechanical equipment area (not shown) of the refrigerator 34, is electrically connected to the household or commercial electrical outlet (not shown) and the lights 138. The transformer steps-down provides a 12 volt electrical current to the lights 138 well below the Underwriters Laboratory® (hereinafter UL) established limits. Reducing the electrical power below the UL threshold for appliances reduces, or eliminates, the risk of electrical shock.

The lifetime of the lights 138 is designed to be approximately 1000 hours. Since the lights 138 will burn only a few minutes each day when the door 46 is open, the life of the lights 138 will likely exceed the life of the appliance 34 itself. Even if a few lights 138 burn out before the appliance 34 meets its useful life, a plurality of lights 138 will remain lit and hence will adequately illuminate the shelf 30 and the appliance compartment 32.

In the embodiments depicted in FIGS. 7–8 and 11, electrical power is supplied to the lights 138 by connecting a pair of male electrical connector posts 140, preferably located on the rear edge 138 of each end cap 36, 38, within female electrical connectors 142 located in the tracks 132. In a preferred embodiment, the connector posts 140 are spring loaded to locate themselves with the female electrical connectors 142 upon engagement of the shelf 30 on the track 134. As depicted in FIG. 12, wires 144 located within the end caps 86, 88 electrically connect the male connector posts 140 to each light 138. Preferably, the lights 138 are wired in parallel.

In an alternative embodiment, electrical power is supplied to the lights 138 by causing one side of the track 134 to become positively charged and the other side of the track 134 to become negatively charged. A wire 146, printed on the rear edge 62 of the plate 48, connects the positively and negatively charged sides of the pair of tracks 132 when the shelf 30 is located in the compartment 32, as depicted in FIG. 15. The printed wire 146 is also electrically connected to the wires 144 located in the end caps 86, 88 thereby providing electricity to the lights 138, as depicted in FIG. 13.

In both of the above embodiments, the pair of tracks 132 is electrically connected to a switch (not shown) located between the compartment 32 and the door 46. As is known by those skilled in the art, the switch is energized when the door 46 is opened, thereby supplying electrical power to the tracks 132. The switch is de-energized when the door 46 is closed.

As seen in FIGS. 14 and 15, the lights 138 are preferably located on a pre-wired string 148. The string 148 of lights 138 is located within a recess 150 within the end caps 86, 88, depicted in FIGS. 9 and 12. The string 148 of lights 138 is connected to the male connector post 140, or alternatively, to the printed wire 146, to supply power. Enclosing caps 152 attach to the end caps 86, 88 to form the front 98 and rear 100 end cap surfaces and to close off the recess 150.

Figure 10:
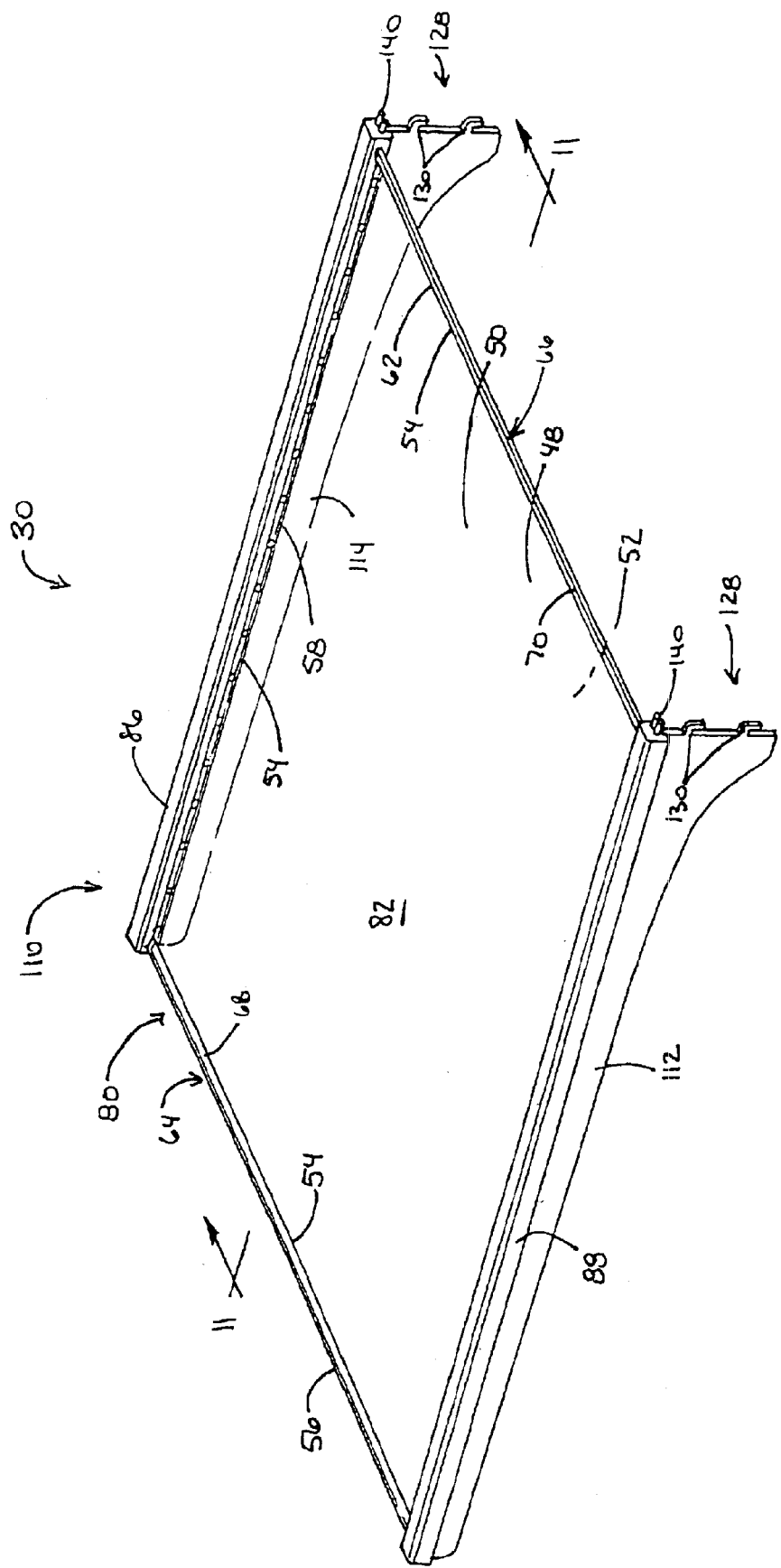
FIG. 10 is an isometric view of a cantilever supported shelf having lighting within end caps.

FIGS. 7 and 10 depict the location of the lights 138 for the channel end cap 104 and the cantilevered end cap 110 in greater detail. The lights 138 are located substantially within the same horizontal plane as the glass plate 48. A preferred embodiment is depicted in FIG. 9, wherein one of the plurality of lights 138 is shown in an abutting relationship with one of the edges 58 or 60 of the plate 48 of a channel supported shelf 104. Similarly, in FIG. 12, one of the plurality of lights 138 is shown in an abutting relationship with one of the edges 58 or 60 of the plate 48 of a cantilever supported shelf 104. The lights 138 are located in an abutting relationship with an edge 58 or 60 to concentrate substantially all of the light from the light 138 into the plate 48. Additionally, the edges 58 or 60 of the plate 48 are highly polished to aid in the transmittal of light from the light 138 into the plate 48 and hence, the compartment 32.

Figure 17:
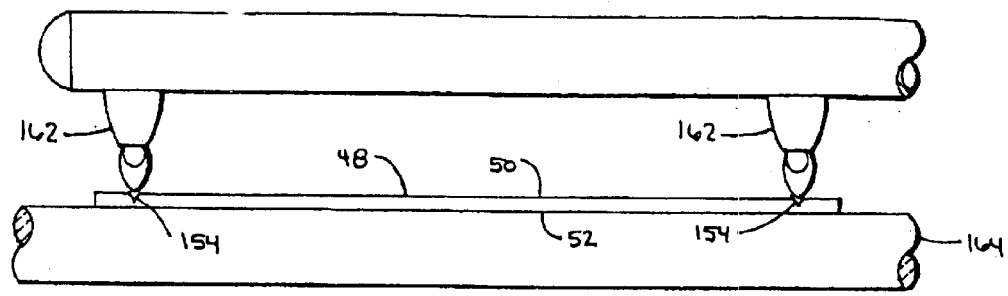
FIG. 17 is a sectional view along line 17—17 of FIG. 16.
Figure 18:
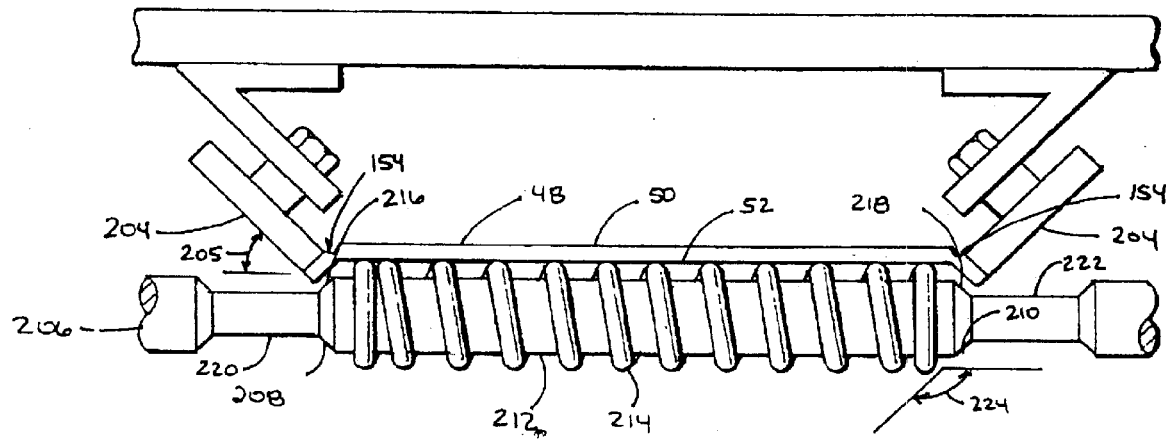
FIG. 18 is a sectional view along line 18—18 of FIG. 16.

The process for forming the spill-proof shelf 30 is described hereinafter. The shelf 30 is preferably created from a pre-cut flat glass plate 48 approximately 16–18 inches wide and 16–18 inches long, however, the plate 48 can be any size within the strength and deflection limits of a two side supported shelf 30. In one embodiment, the front 68 and rear 70 flanges are formed in a process which begins with milling two kurfs 154, or grooves, in the lower surface 52 of the plate 48 as best seen in FIGS. 17 and 18. Each kurf 154 acts like a joint, or guide, along which the flanges 68, 70 are uniformly deflected. As best seen in FIG. 20, the use of a kurf 154 to produce an upwardly turned flange 68, 70 results in a well-defined, edge-like transition 156 between the substantially flat plate and the flange itself.

The kurfs 154 are preferably located approximately 0.157 to 0.315 inches inward from the front 56 and rear 62 edges. In the most preferred embodiment, the kurfs 154 are located approximately 0.236 inches inward from the front 56 and rear 62 edges.

The kurfs are created by placing a grinding wheel (not shown) in contact with the lower surface 52 of the plate 48. In a preferred embodiment, the kurfs 154 are approximately 38% to 50% the thickness of the plate 52. The grinding wheel may be any device known in the art of glass cutting which is capable of locating straight kurfs 154 in the plate 48. Preferably, the grinding wheel has a metal blade with a diamond slurry located thereon for cutting the kurf 154 both accurately and efficiently.

The grinding wheel is moved in a direction substantially parallel to the front 56 and rear 62 edges and approximately 0.157 to 0.315 inches, but preferably 0.236 inches, from each edge 56, 62 respectively.

Figure 16:
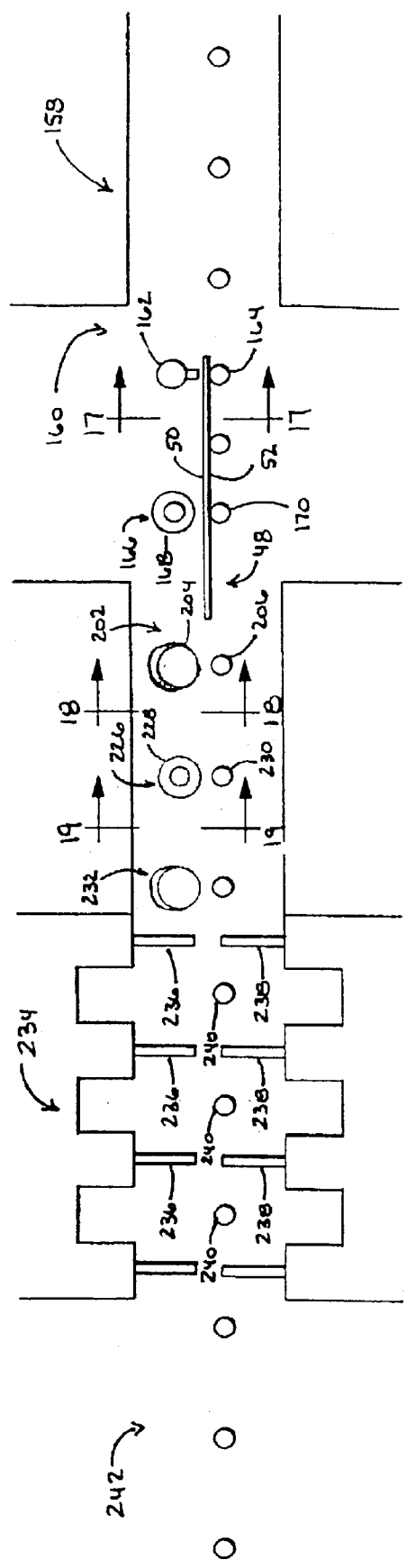
FIG. 16 is a schematic side view depicting an oven, a preform heat section, a roll form section, an air quench section and a cooling section.

After the kurfs 154 are formed, the plate 48 is preferably loaded into an oven 158 as depicted in FIG. 16. The oven 158 may be such as a continuous roller hearth oven made by TGL Tempering Systems of Pennsauken, N.J., although similar ovens known in the art are well within the scope of the present invention. The plate 48 is loaded into the oven 158 so that the kurf 154 is facing upward to assist with the formation of the upturned edges 56, 62, as will be described in more detail below.

In a preferred embodiment, the plate 48 is heated to a temperature of approximately 1022 degrees F. to 1067 degrees F. In a more preferred embodiment, the plate 48 is heated to a temperature of 1044 degrees F. Heating the plate 48 is required to avoid thermally shocking the plate 48 when additional heat is added to specific areas of the plate 48 as will be described in detail below.

As depicted in FIG. 16, a preform heat section 160 is located substantially adjacent the oven 158. The section 160 has located therein at least two heating elements 162 preferably located in a spaced-apart relationship as shown in FIG. 17. Preferably, the preform heat section 160 has two rows of heating elements 162 wherein each row has 4 to 5 elements per row. The heating elements 162 are substantially directed at each of the kurfs 154 in the plate 52. The heating elements 162 heat the plate 48 and soften the plate 48 along the kurfs 154 sufficiently to enable subsequent manipulation of the plate 48 to create the flanges 68, 70.

The heating elements 162 burn a combination of acetelyne, natural gas, propane or diesel fuel in the presence of added oxygen. The added oxygen elevates the combustion temperature at the heating elements 162. The heating elements 162 soften the glass along the kurfs 154 by elevating the temperature along the kurfs 154 to a temperature known in the art of glass forming. Preferably, the heating elements elevate the temperature along the kurfs 154 to between 1832 to 2192 degrees F., but in a more preferred embodiment, to a temperature of approximately 2012 degrees F.

The plate 48 is transported through the preform heat section 160 on rollers 164. The rollers 164 support the plate 48 from below, substantially along the entire length of the section. The rollers 164 are constructed of ceramic or fused silica materials, however, other similar temperature resistant materials may be used without departing from the scope or spirit of the invention.

Figure 19:
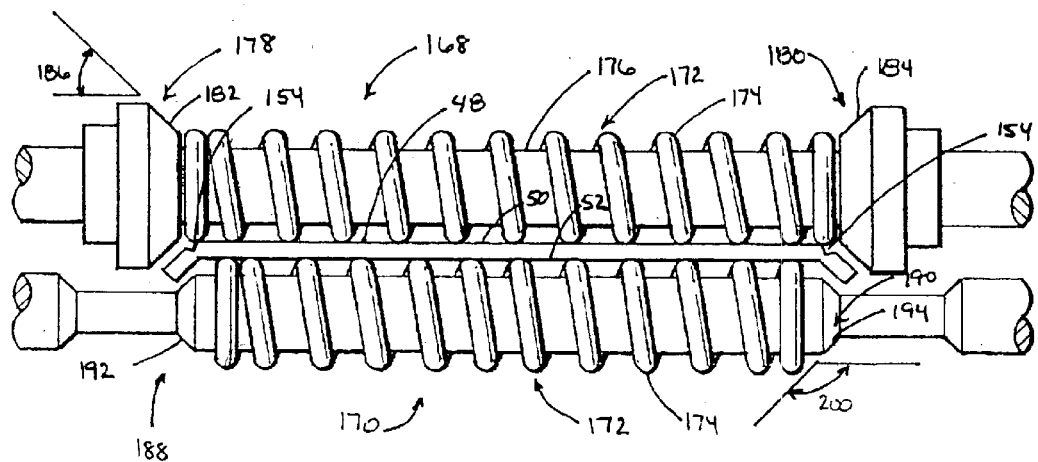
FIG. 19 is a sectional view along line 19—19 of FIG. 16.

In a preferred embodiment, after the plate 48 exits the pre-form heat section 16, the plate 48 immediately passes between a first set 166 of a plurality of upper 166 and lower 170 forming rollers, as depicted in FIGS. 16 and 19.

The first set 166 of upper 168 and lower 170 forming rollers are preferably constructed of a high-temperature steel, ceramic, or fused silica material, although other materials known for their high-temperature resistance are well within the scope of the present invention. In a more preferred embodiment, the upper 168 and lower 170 rollers are constructed of high-temperature steel and encircled with temperature resistant wraps 172. In a most preferred embodiment, the wraps 172 are KEVLAR® ropes 174 located along the entire length of a substantially cylindrical, constant diameter interior portion 176 of the rollers 168, 170. Preferably, the ropes 174 are approximately 0.125 to 0.5 inches in diameter. In a most preferred embodiment, the ropes 174 are approximately 0.25 inches in diameter. The ropes 174 maintain the hot glass plate 48 from the rollers 168, 170.

A first 178 and second 180 frusto-conical section bounds the interior portion 176 of the upper roller 168. Preferably, the first 178 and second 180 sections each have a frusto-conical surface 182, 184 respectively, which linearly increases the diameter of the cylindrical section 176. The frusto-conical surfaces 182, 184 of the first and second sections 178, 180 rotate with the driven upper roller 168 and receive the glass plate 48. The surfaces 182, 184 simultaneously urge the front 68 and rear 70 flanges downwardly. The surfaces 182, 184 act to urge the flanges 68, 70 downwardly at a deflection angle 186 preferably between 30 and 90 degrees, however, in a most preferred embodiment, the angle 186 is approximately 45 degrees. The deflection angle 186 is depicted in FIG. 19.

As depicted in FIGS. 17–19, the plate 48 is oriented with the kurfs facing up so that gravity, in combination with the forming rollers 168, 170, can urge the softened flanges 68, 70 in a downward orientation. The force of gravity also assists in maintaining the flanges 68, 70 in a downward orientation as the plate 48 begins to contract as it cools.

As best seen in FIG. 16, the first lower forming roller 170 is located substantially below the first upper forming roller 168. The lower forming roller 170 is constructed of materials substantially identical to the upper forming roller 168 and provided with KEVLAR® ropes 174 substantially identical in form and function to those disclosed above, as depicted in FIG. 19.

As best seen in FIG. 19, third 188 and fourth 190 frusto-conical sections bound a cylindrical, interior portion 176 of the lower forming roller 170. Preferably, the third 188 and fourth 190 sections each have a frusto-conical surface 192, 194 respectively, which linearly decreases the diameter of the interior portion 176 to two reduced diameter portions 196, 198. The reduced diameter portions 196, 198 accept the flanges 68, 70 of the plate 48 being urged downwardly by the first 178 and second 180 frusto-conical sections of the upper forming roller 168.

The surfaces 192, 194 have a taper angle 200 complimentary to the deflection angle 186 of the upper forming roller 168, as depicted in FIG. 19. Preferably, the taper angle 200 substantially matches the deflection angle 186 so that the surfaces 192, 194 of the third 188 and fourth 190 sections are substantially parallel to the surfaces 182, 184 of the first 178 and second 180 sections. The frusto-conical surfaces 192, 194 of the third 188 and fourth 190 sections act as a barrier to prevent, or minimize, deflection of the flanges 68, 70 downwardly beyond the desired angle.

After the plate 48 leaves the first set 166 of upper 168 and lower 170 forming rollers, the flanges 68, 70 may deflect slightly from the desired deflection angle 186 as the plate 48 begins to cool. To prevent, or reduce, the deflection of the flanges 68, 70, the plate 48 is contacted by a first set of guide rollers 202 located behind the first set of forming rollers 166 as depicted in FIGS. 16 and 18. The first set of guide rollers 201 has at least one upper roller 204 and at least one lower roller 206. Preferably, neither the upper 204 nor the lower 206 guide rollers are driven, but instead are designed to rotate upon contact with the plate 48 passing underneath.

In one preferred embodiment, there are at least two upper guide rollers 204 which are constructed of a ceramic or fused silica material, however, any material known in the art capable of withstanding the high temperature environment is within the scope and spirit of the invention. The upper guide rollers 204 are positioned to come into contact with the lower surfaces 74, 78 of the front 68 and rear 70 flanges to maintain the flanges 68, 70 in the same downward orientation as initially set by the forming rollers 168, 170. Therefore, in a preferred embodiment, the upper guide rollers 204 are positioned to deflect the flanges 68, 70 downwardly at a deflection angle 205 between 30 and 90 degrees from the horizontal. In a most preferred embodiment, the upper guide rollers 204 are positioned to deflect the flanges 68, 70 downwardly at a deflection angle 205 of 45 degrees, as depicted in FIG. 18.

The lower guide roller 206 is substantially identical in form and function to the lower forming roller 170 discussed above. The lower guide roller 206 is located substantially below the first upper guide roller 204 as shown in FIGS. 16 and 18. The lower guide roller 206 has first 208 and second 210 frusto-conical surfaces which bound a constant diameter, cylindrical, interior portion 212. The constant diameter interior portion 212 is wrapped with a KEVLAR® rope 214 as disclosed above to maintain the hot glass plate 48 from the interior portion 212 and to support the plate 48 over the roller 206. The first 208 and second 210 frusto-conical sections each have frusto-conical surfaces 214, 216 respectively, which linearly decrease the diameter of the interior portion 212 to two reduced diameter portions 220, 222, as depicted in FIG. 18. The surfaces 216, 218 have a taper angle 224 which substantially matches the deflection angle 205 of the upper guide rollers 204. The frusto-conical surfaces 216, 218 prohibit, or prevent, the flanges 68, 70 from deflecting downwardly beyond the desired angle. The reduced diameter portions 220, 222 accept the flanges 68, 70 of the plate 48 being urged downwardly by the upper guide rollers 204.

In a preferred embodiment, after exiting from the first set of guide rollers 202, the plate 48 enters a second set 226 of upper 228 and lower 230 forming rollers as depicted in FIG. 16. The second set of forming rollers 226 is constructed and operated in a manner substantially identical to the first set of forming rollers 166. However, by passing the plate 48 through the second forming rollers 226, a more precise definition of the downwardly deflected flanges 68, 70 is achieved.

After exiting the second set of forming rollers 226, the plate 48 is contacted by a second set of guide rollers 232 substantially identical in form and function to the first set of guide rollers 202. Although a first 166 and second set 226 of forming rollers and a first 202 and second set 232 of guide rollers has been disclosed as a preferred embodiment, those skilled in the art will know that the number and order of the forming rollers and guide rollers may differ, yet will remain within the scope of the present invention.

After exiting the second roll forming section 226, the plate 48 enters into a quench section 234 as depicted in FIG. 16. The quench section 234 provides rapid cooling to the plate 48 thereby generating compressive stresses in the glass to provide tempering. Preferably, the quench station 234 has a plurality of upper 236 and lower 238 blast heads for directing pressurized air over at least one major surface of the plate 48. Directing air over the plate 48 to reduces the plate 48 temperature to approximately 300 degrees F. The quench section 234 also preferably includes a plurality of rollers 240 to transport the plate 48 through the quench section 234 and into a final cooling section 242.

In the cooling section 242 depicted in FIG. 16, the plate 48 is cooled from approximately 300 degrees F. to ambient temperature. The plate 48 may be cooled by a forced air system (not shown) blasting air across at least one major surface of the plate 48. The forced air system may be such as blast heads, jets, and/or fans although other known cooling methods are within the scope and spirit of this invention.

Once the plate 48 is cooled to approximately ambient temperature, the plate 48 is turned over so that the flanges 68, 70 form an upstanding barrier 80 to spilled liquids. In one embodiment, the side edges 58, 60 are then bright polished and, if so desired, so are the front 56 and rear 62 upturned edges. The edges 56, 58, 60, 62 may be polished using belt sanders or the like. Polishing the edges 56, 58, 60, 62 requires a steady stream of water and a polishing compound such as cerium oxide or pumice, although other compounds known in the art are within the scope of this invention. The purpose of the water is to keep the plate 48 from overheating and cracking, while the compound helps to abrade the plate 48 and more quickly achieve a polished surface. By using a series of finer and finer abrasive surfaces to wear away the plate 48, it is possible to achieve a high degree of polish.

Figure 23:
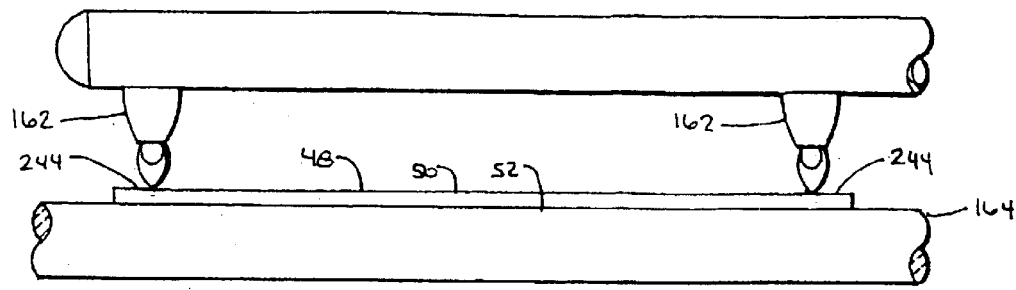
FIG. 23 is an alternative embodiment of a sectional view along line 17—17 of FIG. 16.
Figure 24:
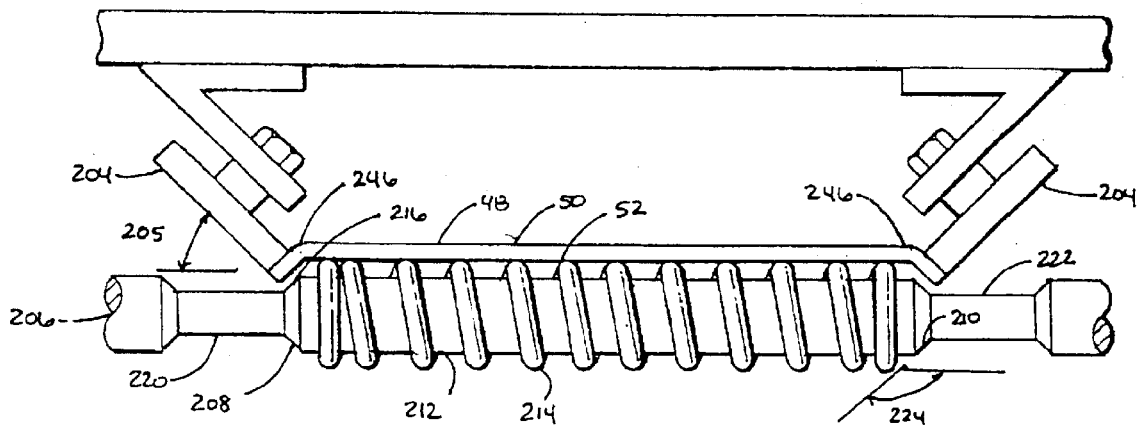
FIG. 24 is an alternative embodiment of a sectional view along line 18—18 of FIG. 16.
Figure 25:
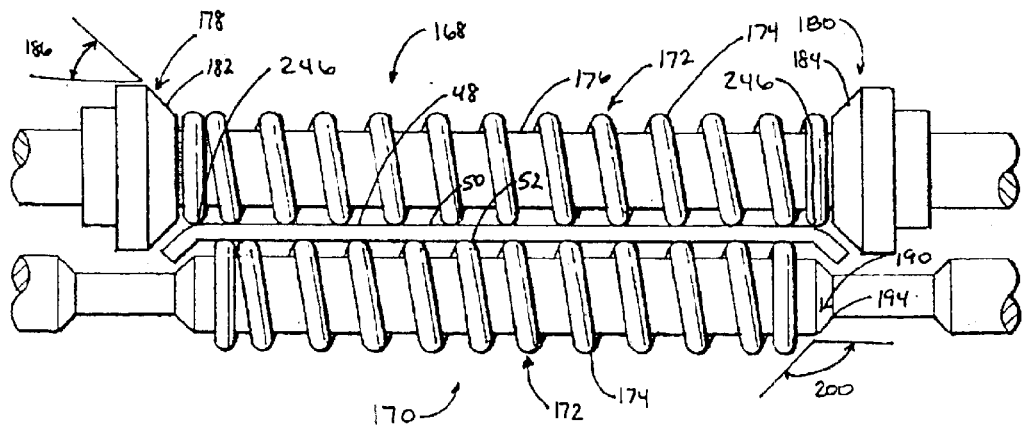
FIG. 25 is an alternative embodiment of a sectional view along line 19—19 of FIG. 16.

In an alternative embodiment, depicted in FIGS. 23–25, one or more upwardly turned flanges 68, 70 are formed without milling kurfs in the plate 48. In this embodiment, the plate 48 may be loaded into the oven 158 with either the upper 50 or lower 52 surface facing upward. The plate 48 is heated in a manner substantially identical as disclosed above and then transported to the preform heat section 160, as depicted in FIG. 16.

In a preferred embodiment, shown in FIG. 23, the heating elements 162 are directed at portions 244 adjacent both the front 56 and rear 62 edges of the plate 48 if both front 68 and rear 70 flanges are desired. If only one flange is desired, the heating elements 162 are directed only at a portion adjacent one edge. Preferably, the plate 48 is oriented so the heating elements 162 are directed at portions 244 on the plate 48 located approximately 0.157 to 0.315 inches inward from both the front 56 and rear 62 edges. In a more preferred embodiment, the plate 48 is oriented so the heating elements 162 are directed at portions 244 on the plate 48 located approximately 0.236 inches inward from both the front 56 and rear 62 edges. The heating elements 162 heat the portions 244 until the softening temperature of the plate 48 is reached. The plate 48 then passes to the first set of forming rollers 166, as shown in FIG. 16.

The front 68 and rear 70 flanges are formed by the forming rollers 166 wherein the frusto-conical surfaces 182, 184 of the upper roller 168 contact the portions 244 of the plate 48, as depicted in FIG. 25. The surfaces 182, 184 simultaneously urge the front 68 and rear 70 flanges downwardly. The surfaces 182, 184, in combination with gravity, act to urge the flanges 68, 70 downwardly at a deflection angle 205 preferably between 30 and 90 degrees, however, in the preferred embodiment, the angle 205 is approximately 45 degrees.

The plate 48 passes through the guide rollers 202, the second set of forming rollers 226, and the quench 234 and cooling 242 sections substantially as disclosed above, and as depicted in FIG. 16. Forming the shelf 48 without a kurf in the plate 48 results in a curved radius 246 transition being formed between the flanges 68, 70 and the substantially flat plate 48, as depicted in FIG. 21.

Figure 22:
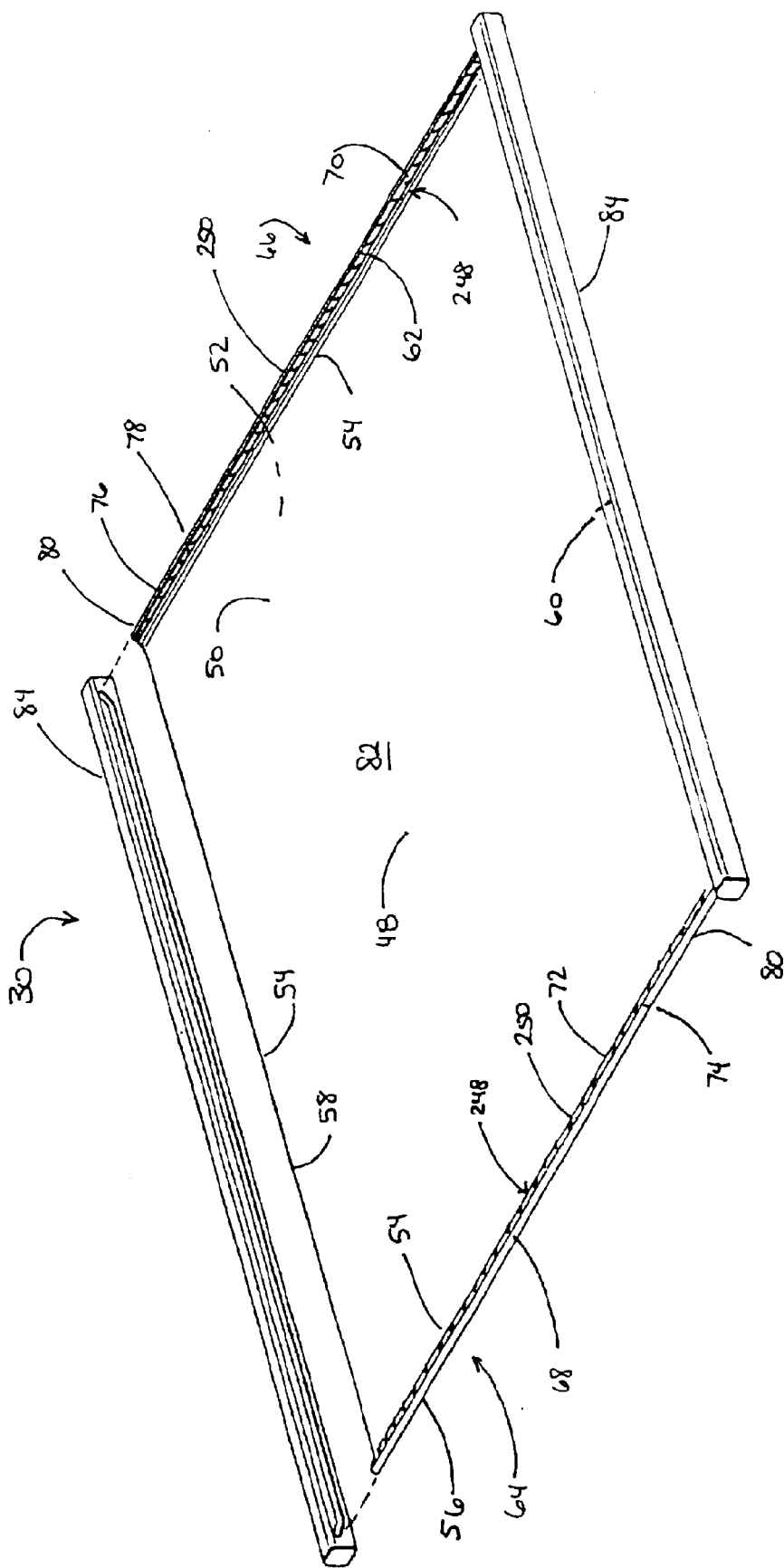
FIG. 22 is an isometric view of an alternative embodiment of a shelf having a coating applied thereon.

According to the method of manufacture described above, a durable and impact resistant shelf 30 is produced capable of meeting the demands typically encountered during regular service. However, if a shelf 30 of exceptional impact resistance is required, a coating 248 may be located on the shelf 30. In a preferred embodiment, the coating 248 is located on the front 68 and rear 70 flanges, as depicted in FIG. 22. More specifically, the coating 248 is located on the front flange upper and lower surfaces 72, 74 and the rear flange upper and lower surfaces 76, 78. The coating 248 is preferably a clear polyester strip 250 having an adhesive located thereon to allow it to be attached to the flanges 68, 70. Preferably, the strip 250 is approximately 0.157 to 0.315 inches thick. Although a polyester material is disclosed, other materials capable of adding impact resistance to the flanges 68, 70 known by those skilled in the art are well within the scope of this invention.

The end caps 86, 88 are located on the left 58 and right 60 edges according to several different embodiments. In one embodiment, the end caps 86, 88 are pre-molded to the desired dimensions and then attached to the edges 58, 60. This embodiment is depicted in FIG. 2 wherein the end caps 86, 88 may be individually molded to accept the corresponding left 58 or right 60 edges of the plate 48, including the upturned front 56 and rear 62 edges.

In another embodiment, the end caps 86, 88 may be extruded directly onto the side edges 58, 60. During the extrusion process, the plate 48 is positioned within an empty mold (not shown). Moldable material (not shown), from which the end caps 86, 88 will be formed, is injected into a cavity adjacent the side edges 58, 60 of the plate 48, thereby encapsulating the plate 48. Once hardened, the moldable material becomes a homogeneous mass of resilient material extending from, and including, the front, upturned edge 56 of the plate 48 to the rear, upturned edge 62 of the plate 48. In the embodiment wherein the pre-molded or extruded end caps 86, 88 are to be located on a channel supported shelf 104, as shown in FIGS. 1 and 2, the end caps 86, 88 are molded or extruded to receive the plate 48 and to the dimensions of the channel 106. Alternatively, in the embodiment wherein the pre-molded or extruded end caps 86, 88 are to be used in combination with a cantilevered beam 112, 114, the end caps 86, 88 are molded or extruded to receive the plate 48 and the cantilevered beam 112, 114, as shown in FIGS. 4 and 6.

Figure 26:
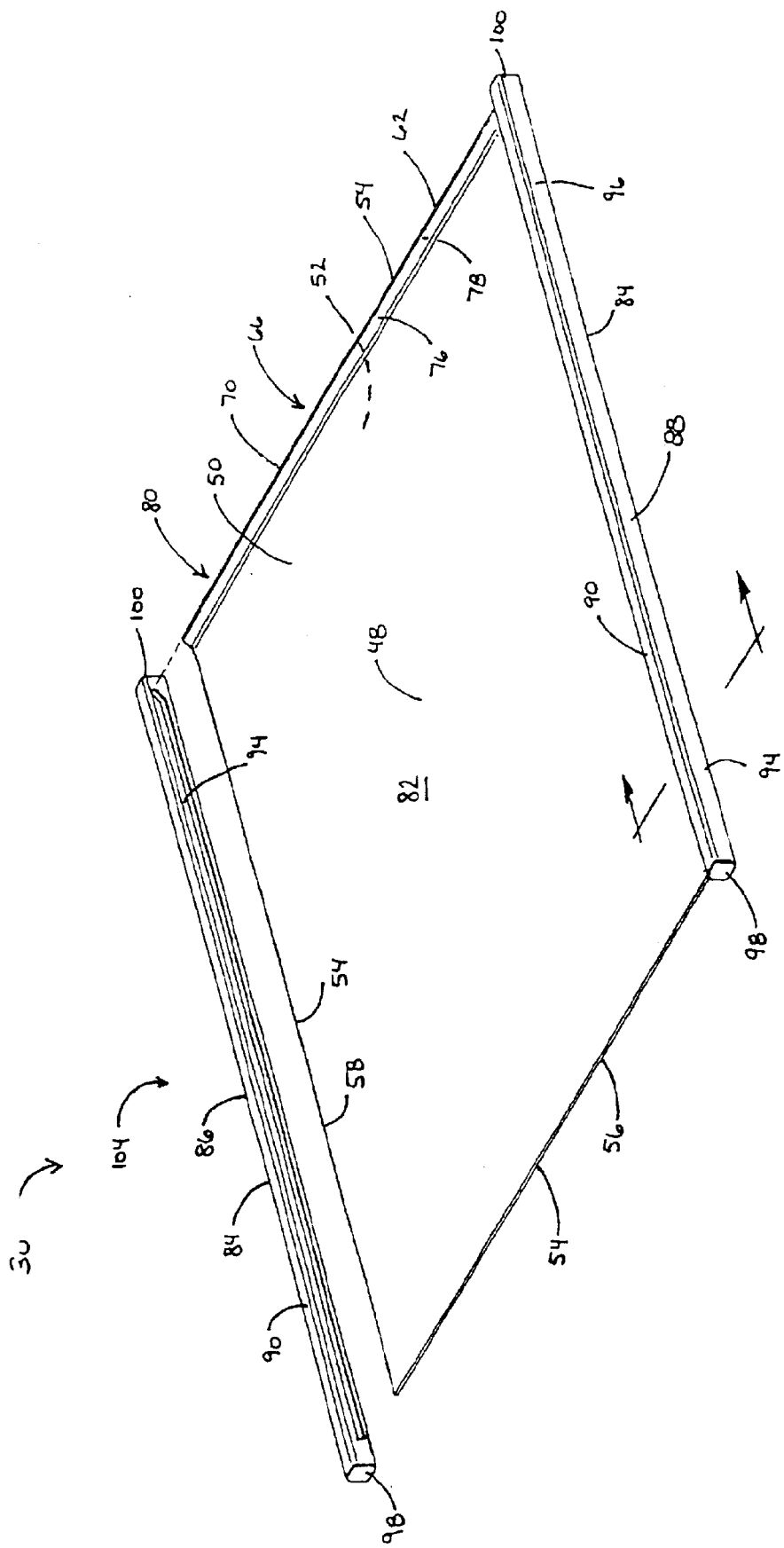
FIG. 26 is an isometric view of an alternative embodiment of a channel supported shelf.
Figure 27:
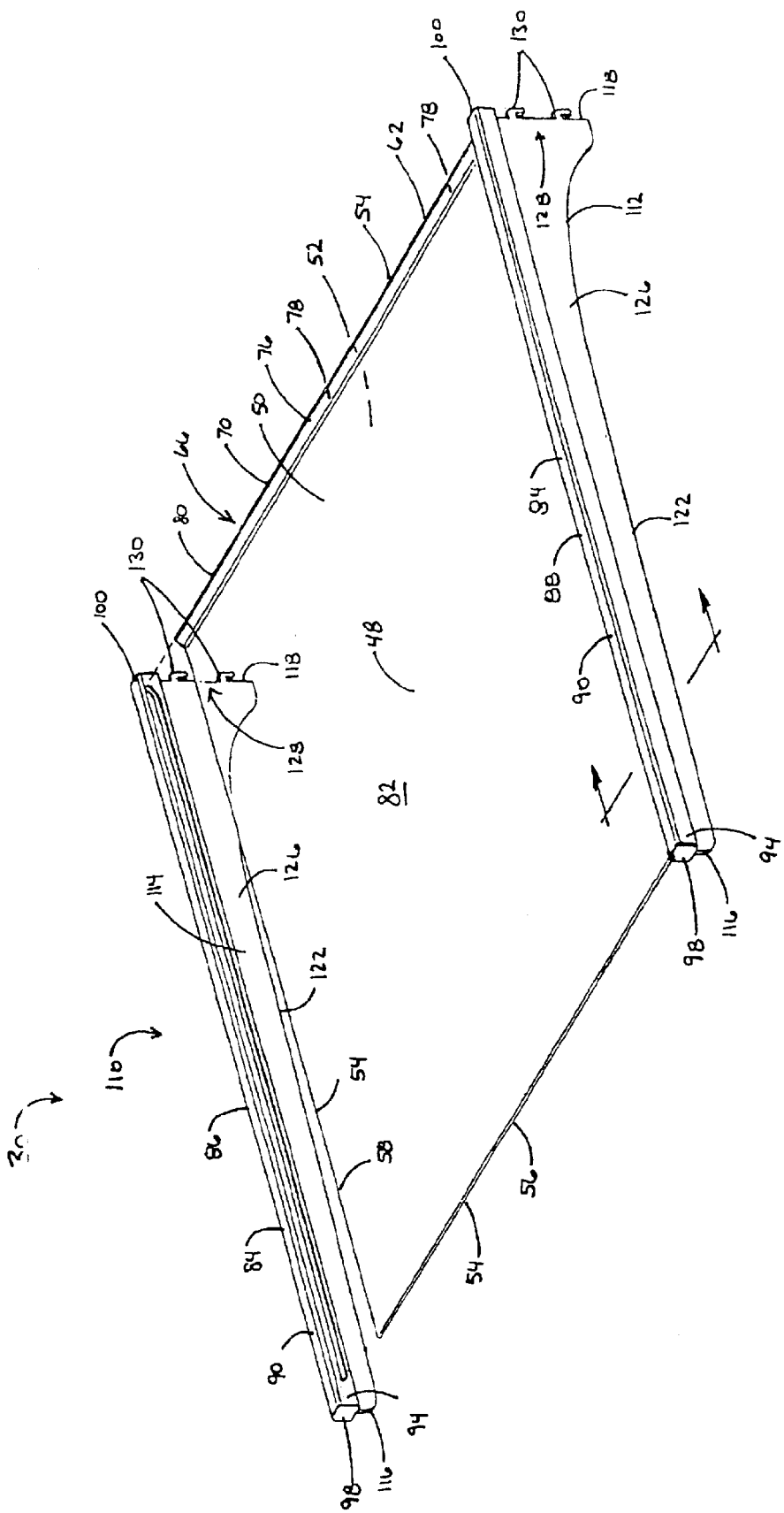
FIG. 27 is an isometric view of an alternative embodiment of a cantilever supported shelf.
Figure 28:
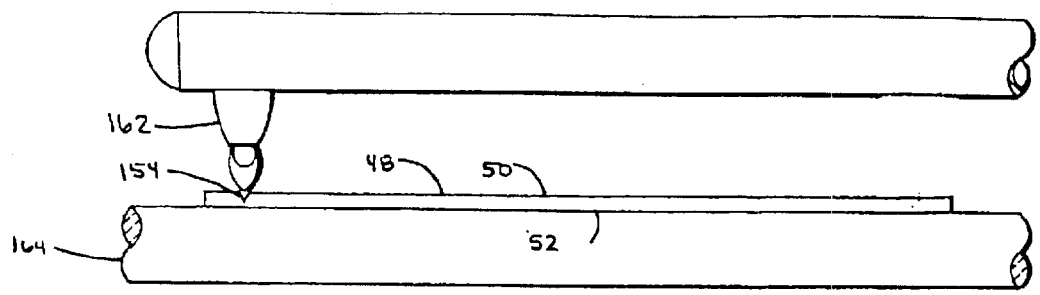
FIG. 28 is an alternative embodiment of a sectional view along line 17—17 of FIG. 16.
Figure 31:
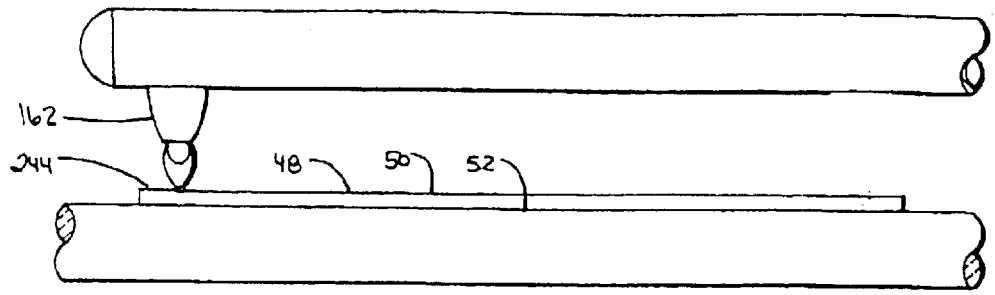
FIG. 31 is an alternative embodiment of a sectional view along line 17—17 of FIG. 16.

In an alternative embodiment, only one edge is upturned to form either a front 66 or rear 70 flange. Either the front 56 or rear 62 edge may be upturned. For illustrative purposes, the rear edge 62 of a channel supported shelf 104 and the rear edge 62 of a cantilever supported shelf 110 are depicted in FIGS. 26 and 27 respectively. The edge 56 or 62 is formed either with a kurf 154 or without a kurf 154. In the embodiment wherein a kurf 154 is located in the plate 48, the kurf 154 is located proximate either the front 56 or rear 62 edge of the plate 48 substantially as discussed above, as illustrated in FIG. 28. Whether having kurfs or not, the plate 48 is heated in the oven 158 and transported to the preform heat section 160. One or more heating elements 162 are directed substantially at the kurf 154 or the portions 244 adjacent the edge 56 or 62, as shown in FIGS. 16, 28 and 31, as the case may be.

Figure 30:
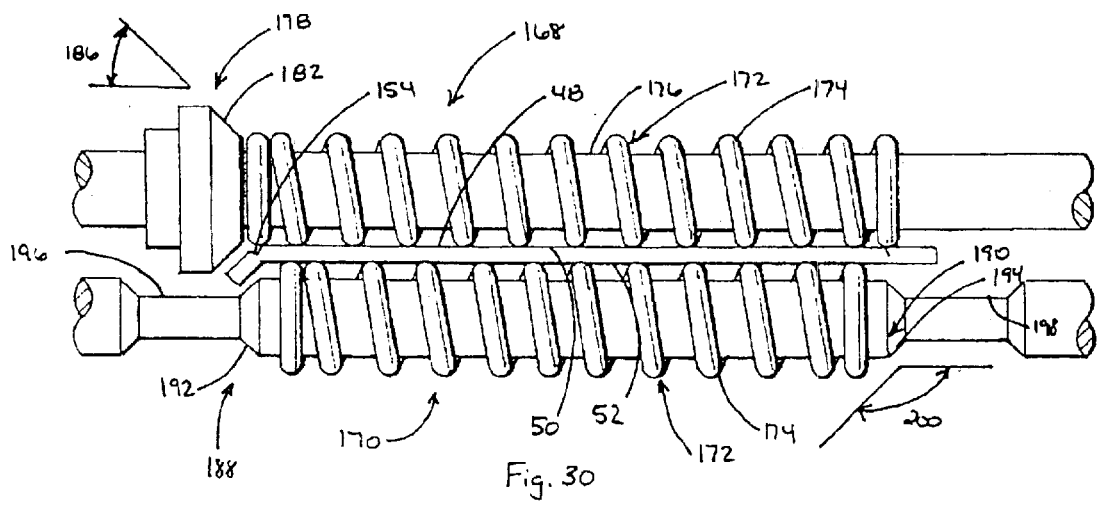
FIG. 30 is an alternative embodiment of a sectional view along line 19—19 of FIG. 16.
Figure 33:
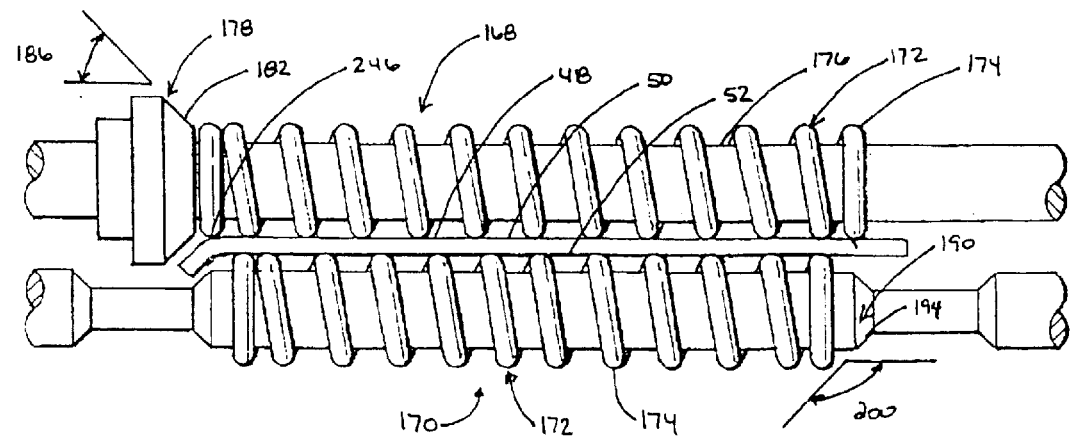
FIG. 33 is an alternative embodiment of a sectional view along line 19—19 of FIG. 16.

As depicted in FIG. 16, the plate 48 exits the preform heat section 160 and is contacted by the upper 168 and lower 170 rollers. In this embodiment of the invention, the upper 168 and lower 170 rollers preferably each only have a single frusto-conical section 178. The single frusto-conical surface 182 of the upper roller 168 urges a flange 68 or 70 downwardly adjacent the complimentary frusto-conical surface 192 of the lower roller 170. A plate 48 with a single flange 68 or 70, the flange 68 or 70 being formed with a kurf 154, is depicted in contact with the upper 168 and lower 170 rollers in FIG. 30. A plate 48 with a single flange 68 or 70, the flange 68 or 70 being formed without a kurf, is depicted in contact with the upper 168 and lower 170 rollers in FIG. 33.

Figure 29:
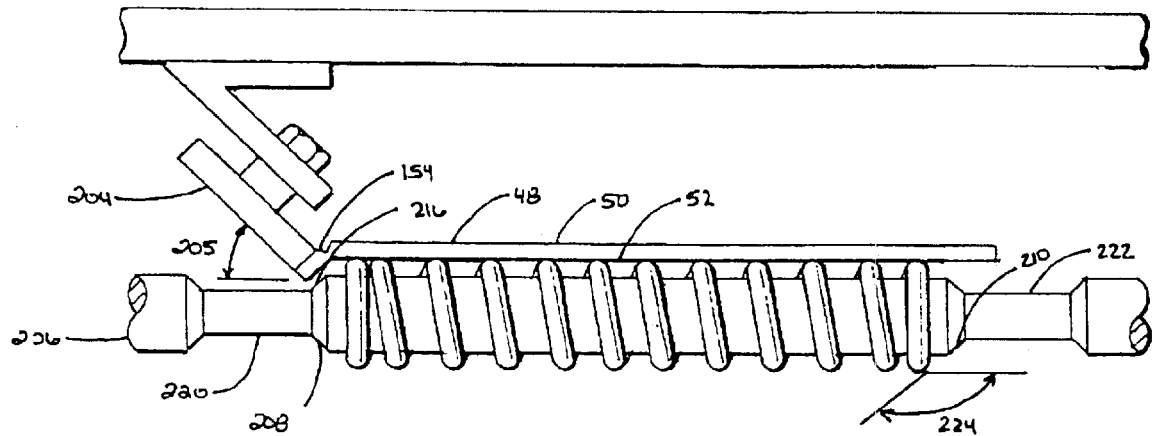
FIG. 29 is an alternative embodiment of a sectional view along line 18—18 of FIG. 16.
Figure 32:
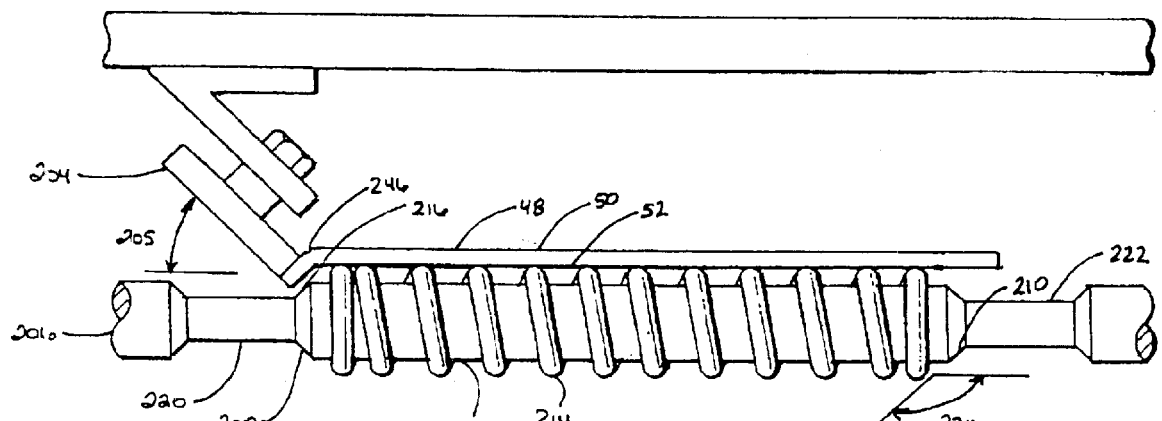
FIG. 32 is an alternative embodiment of a sectional view along line 18—18 of FIG. 16.

After the plate 48 exits the first set 166 of upper 168 and lower 170 forming rollers, the plate 48 is contacted by the first set of guide rollers 202. The guide rollers 202 have substantially the same form and function as described above, however, only one upper guide roller 204 contacts the single flange 68 or 70. A plate with a single flange 68 or 70, the flange 68 or 70 being formed with a kurf 154, is depicted in contact with guide rollers 204 and 206 in FIG. 29. A plate with a single flange 68 or 70, the flange being formed without a kurf, is depicted in contact with guide rollers 204 and 206 in FIG. 32.

The plate 40 is processed through the second set of forming rollers 226 and guide rollers 232 as previously discussed yet modified to accommodate the single upturned flange 68 or 70 discussed above and depicted in FIG. 16. Similarly, the plate 48 is processed through the quench 234 and cooling 242 sections and one or more edges 56, 58, 60, 62 of the plate 48 may be polished, depending upon the embodiment. One or more end caps 86, 88 are located on the edges 58, 60 adjacent the upturned flange 68 or 70 to form the reservoir 82 as discussed above.

In the embodiment wherein lights 138 are located within the end caps 86, 88, a pre-wired string of lights 148 is located within the recess 150 of each end cap 86, 88 either manually or robotically. In the embodiment wherein the shelf 30 is a cantilever supported shelf 110, the shelf 110 is installed onto the tracks 132 and each male electrical connector post 140 is located within a female electrical connector 142 to supply power to the shelf 30. In the embodiment wherein the shelf 30 is a channel supported shelf 104, the shelf 104 is slid into the channels 106 and each male electrical connector post 140 is located within a female electrical connector 142 to supply power to the shelf 30.

In accordance with the provisions of the patent statutes, the present invention has been described in what is considered to represent its preferred embodiments, however, it should be noted that the invention can be practiced otherwise that as specifically illustrated and described without departing from its scope or spirit.

What is claimed is:

1. A refrigerator shelf for containing liquids spilled thereon, comprising:
    a glass plate having a substantially planar surface; and
    a barrier for containing spilled liquids to said shelf, said barrier including at least two upwardly turned portion integrally formed from said surface and end caps, wherein each of said upwardly turned portions has a left edge and a right edge and wherein said left edge is encapsulated by a first end cap and said right edge is encapsulated by a second end cap to complete said barrier.

2. A shelf as defined in claim 1, wherein said shelf is a half-width shelf for a side-by-side refrigerator and freezer unit.

3. A shelf as defined in claim 1, wherein said shelf is a half-width shelf for an over-under refrigerator and freezer unit.

4. A shelf as defined in claim 1, wherein said plate is an optically clear, tempered glass plate having an upper surface, a lower surface, and a perimeter edge having a front edge, a left edge, a right edge and a rear edge.

5. A shelf as defined in claim 4, wherein said glass plate is a soda-lime-silicate glass plate.

6. A shelf as defined in claim 4, wherein a portion of said glass plate adjacent said front edge is one of said upwardly turned portions and a portion of said plate adjacent said rear edge is the other of said upwardly turned portions.

7. A shelf as defined in claim 6, wherein said upwardly turned portion adjacent said front edge is a front flange, and said upwardly turned portion adjacent said rear edge is a rear flange.

8. A shelf as defined in claim 7, wherein said front flange has an upper and lower surface.

9. A shelf as defined in claim 7, wherein said rear flange has an upper and a lower surface.

10. A shelf as defined in claim 4, wherein said end caps are located on said left and said right edges of said plate.

11. A shelf as defined in claim 7, wherein said flanges are approximately 0.157 to 0.315 inches wide.

12. A shelf as defined in claim 11, wherein said flanges are approximately 0.236 inches wide.

13. A shelf as defined in claim 7, wherein said flanges are upwardly turned approximately 30 to 90 degrees from the horizontal.

14. A shelf as defined in claim 13, wherein said flanges are upwardly turned approximately 45 degrees from the horizontal.

15. A shelf as defined in claim 7, wherein a coating is located on said flanges to impart impact resistance to said flanges.

16. A shelf as defined in claim 15, wherein said coating is approximately 0.118 to 0.197 inches thick.

17. A shelf as defined in claim 15, wherein said coating is a polyester material.

18. A shelf as defined in claim 1, wherein said end caps have a top, a left, a right, a bottom, a front and a rear surface.

19. A shelf as defined in claim 7, wherein said end caps meet with said upwardly turned front and rear flanges to form a reservoir for spilled liquids.

20. A shelf as defined in claim 10, wherein a seal is located between said plate and said right and left end caps to form a fluid tight barrier between said plate and said end caps.

21. A shelf as defined in claim 20, wherein said seal is a siloxane-type polymer.

22. A shelf as defined in claim 20, wherein said seal is a room temperature vulcanizing silicon adhesive.

23. A shelf as defined in claim 1, further comprising a cantilever beam located on the bottom surface of the end cap.

24. A shelf as defined in claim 23, wherein said cantilever beam has a front edge, a rear edge, a top edge, a bottom edge, and a left and a right surface.

25. A shelf as defined in claim 24, wherein said top edge is securely located to said bottom surface of said end cap.

26. A shelf as defined in claim 1, further comprising a plurality of lights located within said end caps to illuminate said shelf.

27. A shelf as defined in claim 26, wherein said lights and the wiring for said lights are located within said end caps to reduce the possibility of electrical shock.

28. A shelf as defined in claim 26, further comprising at least one male electrical connector post located on said end cap and electrically connected to said lights.

29. A shelf as defined in claim 28, wherein at least one said male electrical connector post is spring loaded.

30. A shelf as defined in claim 26, wherein at least one light is located substantially adjacent said plate.

31. A shelf as defined in claim 30, wherein at least one said light is located in an abutting relationship with an edge of said plate.

32. A shelf as defined in claim 30, wherein a plurality of lights are located in an abutting relationship with an edge of said plate.

33. A shelf as defined in claim 6, wherein said left and right edges of said plate are polished to aid in light transmittance.

34. The shelf of claim 4, wherein said end caps each have a channel for receiving at least a portion of at least one of said perimeter edges.

35. The shelf of claim 4, wherein each of said end caps are extruded to a complementary shape of at least a portion of at least one of said perimeter edges, including said upwardly turned portions.

36. The shelf of claim 4, wherein each of said end caps are molded to a complementary shape of at least a portion of at least one of said perimeter edges, including said upwardly turned portions.

* * * * *